USO11553210B2

(12) United States Patent
Francois et al.

(10) Patent No.: US 11,553,210 B2
(45) Date of Patent: Jan. 10, 2023

(54) MANAGING CODING TOOLS COMBINATIONS AND RESTRICTIONS

(71) Applicant: INTERDIGITAL VC HOLDINGS, INC., Wilmington, DE (US)

(72) Inventors: Edouard Francois, Bourg des Comptes (FR); Pierre Andrivon, Liffre (FR); Franck Galpin, Thorigne-Fouillard (FR); Fabrice Leleannec, Mouazé (FR); Michel Kerdranvat, Chantepie (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/299,863

(22) PCT Filed: Dec. 9, 2019

(86) PCT No.: PCT/US2019/065126
§ 371 (c)(1),
(2) Date: Jun. 4, 2021

(87) PCT Pub. No.: WO2020/118287
PCT Pub. Date: Jun. 11, 2020

(65) Prior Publication Data
US 2022/0086493 A1 Mar. 17, 2022

(30) Foreign Application Priority Data

Dec. 7, 2018 (EP) ..................... 18306644
Dec. 7, 2018 (EP) ..................... 18306645

(51) Int. Cl.
H04N 19/70 (2014.01)
H04N 19/103 (2014.01)
(Continued)

(52) U.S. Cl.
CPC .......... *H04N 19/70* (2014.11); *H04N 19/103* (2014.11); *H04N 19/157* (2014.11); *H04N 19/176* (2014.11); *H04N 19/503* (2014.11)

(58) Field of Classification Search
CPC ............................ H04N 19/70; H04N 19/103
See application file for complete search history.

(56) References Cited

U.S. PATENT DOCUMENTS 9,277,200 B2    3/2016   Chen et al.
9,554,146 B2    1/2017   Wang
(Continued)

FOREIGN PATENT DOCUMENTS

GB         2534607       8/2016
WO    WO2008130528   10/2008
WO    WO2017173593   10/2017

OTHER PUBLICATIONS

Boyce, Update to Interoperability Point Syntax, 13. JVET Meeting, Jan. 9, 2018-Jan. 18, 2019, Marrakech, The Joint Exploration Team of ISO/IEC JTC1/SC29/WG11 and ITU-T SG.16, No. JVET-M0451.

(Continued)

*Primary Examiner* — Jerry T Jean Baptiste
(74) *Attorney, Agent, or Firm* — Ronald Kolczynski

(57) ABSTRACT

Video coding tools can be controlled by including syntax in a video bitstream that makes better use of video decoding resources. An encoder inserts syntax into a video bitstream to enable a decoder to parse the bitstream and easily control which tools combinations are enabled, which combinations are not permitted, and which tools are activated for various components in a multiple component bitstream, leading to potential parallelization of bitstream decoding.

20 Claims, 21 Drawing Sheets

(51) Int. Cl.
*H04N 19/157* (2014.01)
*H04N 19/176* (2014.01)
*H04N 19/503* (2014.01)

(56) References Cited

U.S. PATENT DOCUMENTS

| | | | |
|---|---|---|---|
| 9,648,333 | B2 | 5/2017 | He et al. |
| 2014/0098851 | A1 | 4/2014 | Chen et al. |
| 2017/0180737 | A1 | 6/2017 | Ye et al. |
| 2017/0280162 | A1 | 9/2017 | Zhao et al. |
| 2017/0318301 | A1 | 11/2017 | Li et al. |
| 2021/0235072 | A1* | 7/2021 | Ko .................. H04N 19/52 |
| 2021/0250590 | A1* | 8/2021 | Gao ................. H04N 19/157 |
| 2021/0281835 | A1* | 9/2021 | Filippov ........... H04N 19/182 |

OTHER PUBLICATIONS

Boyce et al., JVET AHG Report: Bitstream Decoding Properties Signalling (AHG15), 124. MPEG Meeting—Oct. 8, 2018-Oct. 12, 2018, Macao, Motion Picture Expert Group or ISO/IEC JTC1/SC29/WG11, No. m44018, Sep. 21, 2018, Retrieved from the internet: URL:http://phenix.int-evry.fr/mpeg/doc_end_user/documents/124_Macao/wg11/m44018-JVET-L0015-v2.docx.

Boyce et al., AHG15: Proposed Interoperability Point Syntax, 12. JVET Meeting, Oct. 3, 2018-Oct. 3, 2018; Macao. The Joint Video Exploration Team of ISO/IEC JTC1/SC29/WG11 and ITU-T SB.16, No. JVET-L0044 Sep. 19, 2018, Retrieved from the Internet; URL:http://phenix.int-evry.fr/jvet/doc_end_user/documents/12_Macao/wg11/JVET-L0044-v1.zip JVET-L0044-v1.docx, retrieved on Sep. 19, 2018.

Boyce, Proposed Starting Point for Interoperability Point Syntax, Joint Video Experts Team (JVET) of ITU-T SG 16 WP 3 and ISO/IEC JTC 1/SC 29/WG 11, 12th Meeting: Macao, CN Oct. 3-12, 2018, Document: JVET-L0696-V1.

Samuelsson, Example Restrictions Flags for WC, Joint Video Experts Team (JVET) of ITU-T SG 16 WP 3 and ISO/IEC JTC 1/SC 29/WG 11, 12th Meeting: Macao, CN, Oct. 3-12, 2018, DocumentL JVET-L0042.

Hannuksela, AHG15: Hierarchical Decoding Property Indications, 12. JVET Meeting, Oct. 3, 2018-Oct. 12, 2018, Macao, The Joint Video Exploration Team of ISO/IEC JTC1/SC29/WG11 and ITU-T SG.16, No. JVET-L0043, Sep. 24, 2018, Retrieved from the Internet: URL:http://phenix int-evry.fr/jvet/doc_end_user/documents/12_Macao/wg11/JVET-L0043-v2.zip, JVET-L0043v2clean-hierarchical-decoding-property-indications.docx.

Tourapis, et al., Multi-Component Video Coding: An Extension for Truly Versatile Video/Image Compression, Joint Video Exploration Team (JVET) of ITU-T SG 16 WP 3 and ISO/IEC JTC 1/SC 29/WG 11, 12th Meeting: Macao, CN, Oct. 3-12, 2018, Document: JVET-L0467.

Boyce, et al., Interoperability Point Signaling for VVC, 11. JVET Meeting: Jul. 11, 2018-Jul. 18, 2018, Ljubljana, The Joint Video Exploration Team of ISO/IEC JTC1/SC29/WG11 and ITU-T SG.16, No. JVET-K0311 Jul. 3, 2018, Retrieved from the internet, URL:http//phenix.int-evry.fr/jvet/doc_end_user/documents/11_Ljubljana/wg11/JVET-K0311-v1.zip JVET-K0311v1.docx, retrieved on Jul. 3, 2018.

* cited by examiner

MANAGING CODING TOOLS COMBINATIONS AND RESTRICTIONS

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for simplifications of coding modes based on neighboring samples dependent parametric models.

According to a first aspect, there is provided a method. The method comprises steps for inserting into a video bitstream high level syntax associated with at least one video coding tool; conditionally inserting into said bitstream one or more low level controls for one or more video coding tools based on said high level syntax; activating one or more video coding tools corresponding to one or more video components based on said low level controls; and, encoding the video bitstream using said activated video coding tools.

According to a second aspect, there is provided a method. The method comprises steps for parsing a video bitstream for high level syntax associated with at least one video coding tool; determining one or more low level controls for one or more video coding tools based on said high level syntax; activating one or more video coding tools corresponding to one or more video components based on said determination; and, decoding the video bitstream using said activated video coding tools.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
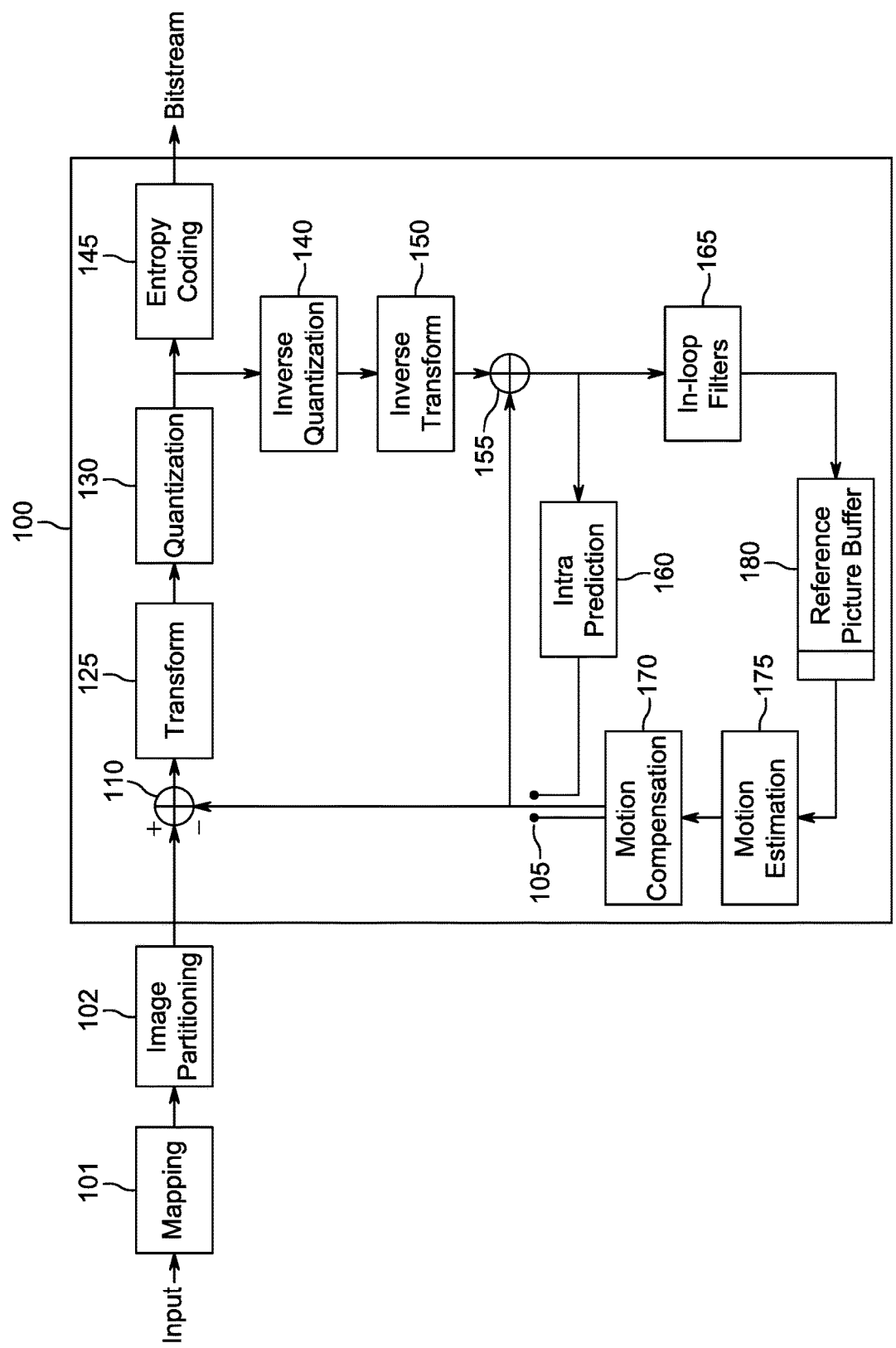
FIG. 1 shows a standard, generic video compression scheme.

The embodiments described here are in the field of video compression and generally relate to video compression and video encoding and decoding. The general aspects described aim to provide a mechanism to operate restrictions in high-level video coding syntax or in the video coding semantics to constrain the possible set of tools combinations.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the HEVC (High Efficiency Video Coding, ISO/IEC 23008-2, ITU-T H.265) video compression standard, motion compensated temporal prediction is employed to exploit the redundancy that exists between successive pictures of a video.

To do so, a motion vector is associated to each prediction unit (PU). Each Coding Tree Unit (CTU) is represented by a Coding Tree in the compressed domain. This is a quad-tree division of the CTU, where each leaf is called a Coding Unit (CU).

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a QT where the blocks have always square shape with equal height and width. In HEVC, the angular intra prediction directions were defined from 45 degree to −135 degree over a 180 angle, and they have been maintained in JEM, which has made the definition of angular directions independent of the target block shape.

To encode these blocks, Intra Prediction is used to provide an estimated version of the block using previously reconstructed neighbor samples. The difference between the source block and the prediction is then encoded. In the above classical codecs, a single line of reference sample is used at the left and at the top of the current block.

In HEVC (High Efficiency Video Coding, H.265), encoding of a frame of video sequence is based on a quadtree (QT) block partitioning structure. A frame is divided into square coding tree units (CTUs) which all undergo quadtree based splitting to multiple coding units (CUs) based on rate-distortion (RD) criteria. Each CU is either intra-predicted, that is, it is spatially predicted from the causal neighbor CUs, or inter-predicted, that is, it is temporally predicted from reference frames already decoded. In I-slices all CUs are intra-predicted, whereas in P and B slices the CUs can be both intra- or inter-predicted. For intra prediction, HEVC defines 35 prediction modes which includes one planar mode (indexed as mode 0), one DC mode (indexed as mode 1) and 33 angular modes (indexed as modes 2-34). The angular modes are associated with prediction directions ranging from 45 degree to −135 degree in the clockwise direction. Since HEVC supports a quadtree (QT) block partitioning structure, all prediction units (PUs) have square shapes. Hence the definition of the prediction angles from 45 degree to −135 degree is justified from the perspective of a PU (Prediction Unit) shape. For a target prediction unit of size N×N pixels, the top reference array and the left reference array are each of size 2N+1 samples, which is required to cover the aforementioned angle range for all target pixels. Considering that the height and width of a PU are of equal length, the equality of lengths of two reference arrays also makes sense.

The invention is in the field of video compression. It aims at improving the bi-prediction in inter coded blocks compared to existing video compression systems. The present invention also proposes to separate luma and chroma coding trees for inter slices.

Figure 14:
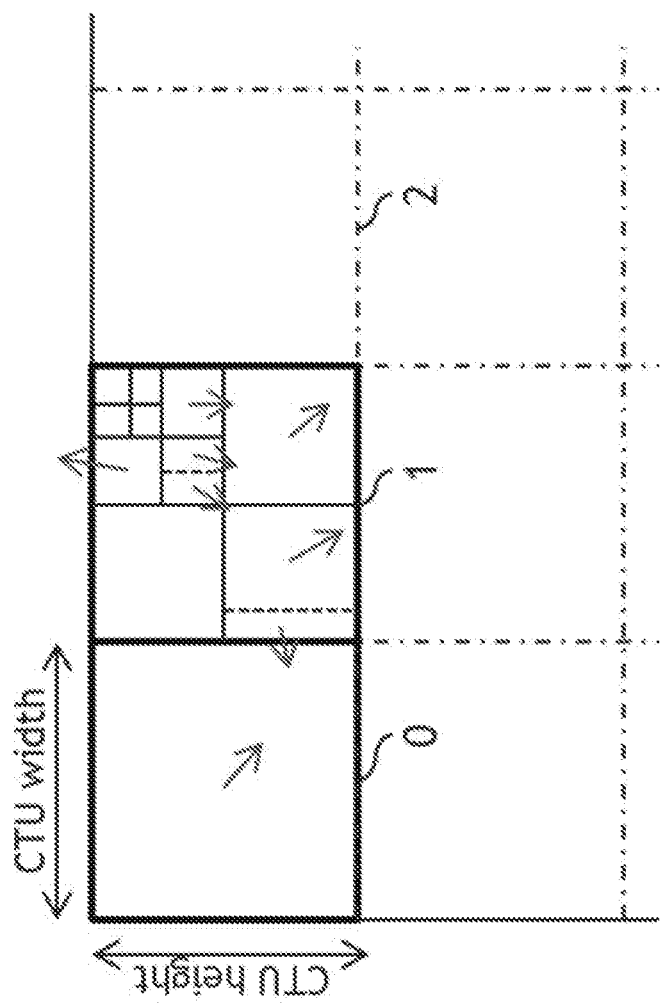
FIG. 14 shows Coding Tree Unit and Coding Tree concepts to represent a compressed HEVC picture.

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU), see FIG. 14.

Figure 15:
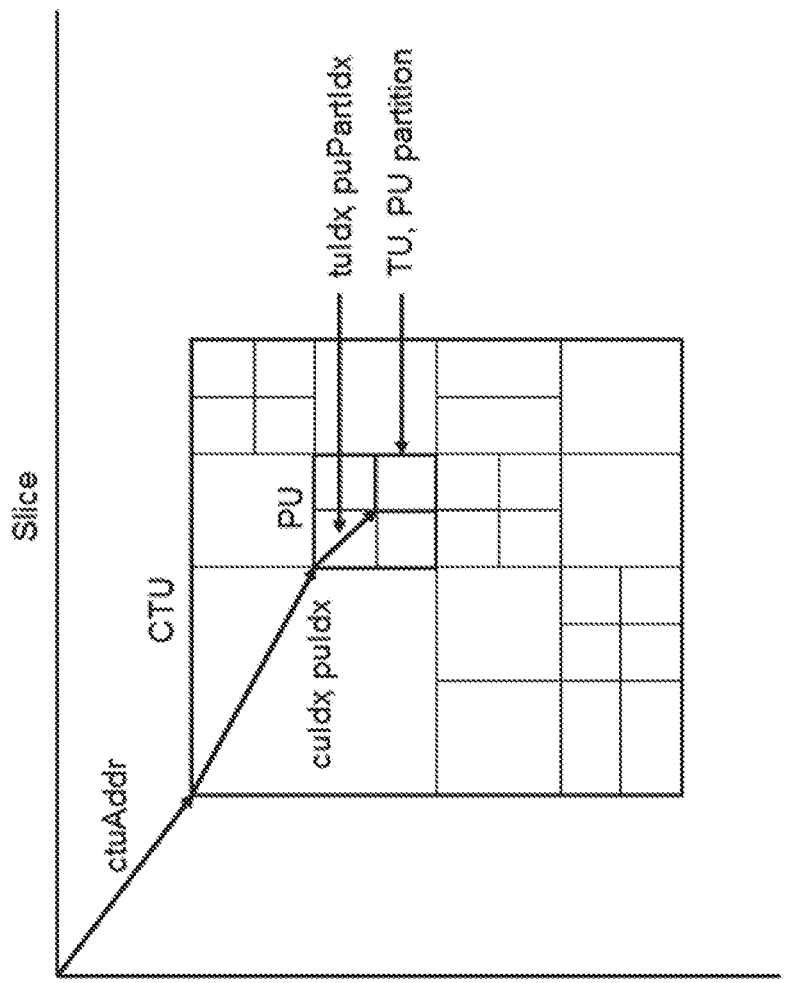
FIG. 15 shows an example division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 15.

New emerging video compression tools include a Coding Tree Unit representation in the compressed domain is proposed, in order to represent picture data in a more flexible way in the compressed domain. The advantage of this more flexible representation of the coding tree is that it provides increased compression efficiency compared to the CU/PU/TU arrangement of the HEVC standard.

Figure 16:
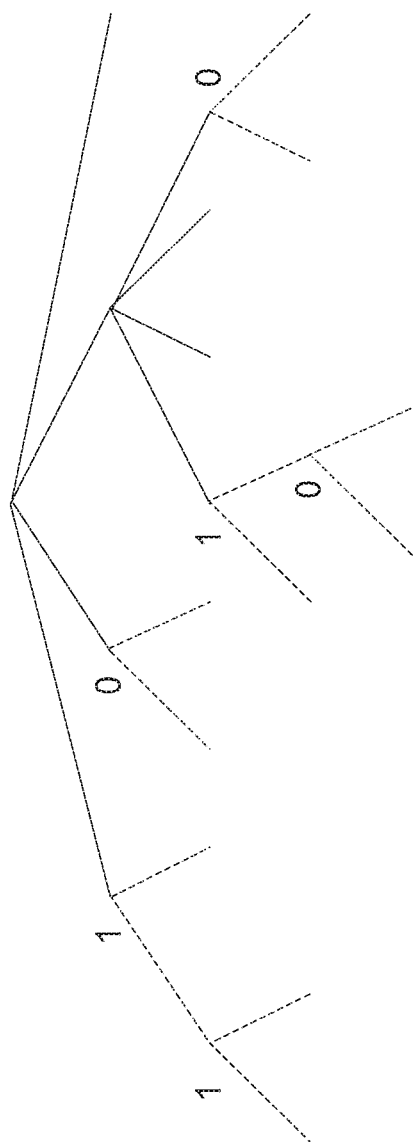
FIG. 16 shows an example Quad-Tree Plus Binary-Tree (QTBT) CTU representation.
Figure 16:
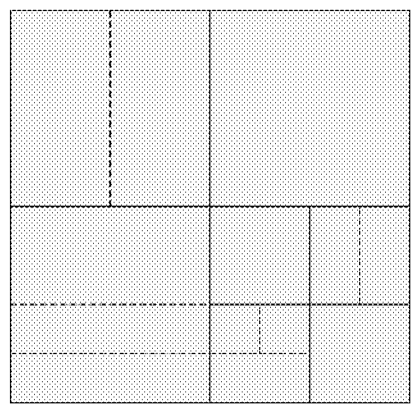

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated on FIG. 16.

The splitting of a coding unit is decided on the encoder side through a rate distortion optimization procedure, which consists is determine the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC.

The QTBT decomposition of a CTU is made of two stages: first the CTU is split in a quad-tree fashion, then each quad-tree leaf can be further divide in a binary fashion. This is illustrated on the right of FIG. 16 where solid lines represent the quad-tree decomposition phase and dashed lines represent the binary decomposition that is spatially embedded in the quad-tree leaves.

The general aspects described herein are in the field of video compression. A video codec is made of a combination of multiple coding tools. The common practice is to standardize the decoder side (syntax and decoding process). Contributions JVET-L0044 "AHG15: Proposed interoperability point syntax" and JVET-L0696 "Proposed starting point for interoperability point syntax" specify a number of high-level syntax elements (in the SPS, or in the profile_tier_level part) aiming at controlling the activation of coding tools in the VVC decoder. The goal of this signaling mechanism is to enable bitstream interoperability points defined by other parties than MPEG or ITU, such as for instance DVB, ATSC, 3GPP. An example of syntax is proposed in Table 1, inserted at the start of the SPS to indicate properties that cannot be violated in the entire bitstream. It is planned in JVET to extend this table for most of the coding tools that will be added to the VVC specification. In principle, it is not the responsibility of JVET to specify profiles or sub-profiles based on these flags. JVET only defines the tools as well as the relationship between constraint flags/parameters and tools.

TABLE 1 syntax elements of SPS to provide interoperability point syntax.

| seq_parameter_set_rbsp( ) { | Descriptor |
|---|---|
| intra_only_constraint_flag | u(1) |
| max_bitdepth_constraint_idc | u(4) |
| max_chroma_format_constraint_idc | u(2) |
| frame_only_constraint_flag | u(1) |
| no_adaptive_loop_filter_constraint_flag | u(1) |
| no_sample_adaptive_offset_constraint_flag | u(1) |
| no_chroma_separate_tree_constraint_flag | u(1) |
| no_dep_quant_constraint_flag | u(1) |
| no_sign_data_hiding_constraint_flag | u(1) |
| no_cclm_constraint_flag | u(1) |
| no_extra_intra_modes_constraint_flag | u(1) |
| no_wide_intra_angles_constraint_flag | u(1) |
| no_multi_trans_constraint_flag | u(1) |
| no_affine_motion_constraint_flag | u(1) |
| no_high_precision_mvs_constraint_flag | u(1) |
| no_temporal_mvp_constraint_flag | u(1) |
| no_sbtmvp_constraint_flag | u(1) |
| no_adaptive_mv_res_constraint_flag | u(1) |
| . . . | |
| } | |

When a constraint flag is set in the SPS (or similar) syntax structure, a decoder can safely assume that the tool will not be used in the bitstream. When a constraint flag is set to 1, the tool may be activated in the associated bitstream.

Some contributions were also proposed to specify similar signalling mechanisms, in particular, JVET-K0311 which provided the initial high-level tools signalling concept, JVET-L0042 which makes a grouping of tools per category, JVET-L0043 which proposes a hierarchical signalling (considered by JVET as possibly too complex to parse).

As the codec comprises many coding tools, this leads to a huge number of possible tools combinations, and in current design, no impact of tools interaction is considered. Also, for some cases, simply de-activating a tool just does not work. A fall-back mode is required for some tools. The invention aims at addressing this issue by inserting a process to restrict, either at syntax, or at semantic level, on the possible tools activation/deactivation.

As mentioned above, the approach being adopted by JVET for controlling the coding tools at a high-level, with a fine granularity, leads to a huge number of tools combinations, some of them being not practical in terms of coding efficiency or implementability.

There are currently no tools combinations restrictions at high-level in the proposed syntax. The main solutions provided in the prior-art are discussed in the previous paragraphs (contributions JVET-L0042 and JVET-L0043), and have not yet been considered by JVET.

The described aspects propose to insert syntax changes or semantics changes to specify tools combinations limitations, given the interactions issues that can arise when some tools are combined together while others are de-activated.

Table 2 gives a list of tools included in VTM3 plus some additional tools being explored and that could be added later on in the VTM. They are classified by category. Rough estimated PSNR-Y BD-rate performance of the tools is provided. A negative number (−x) indicates an average bit-rate saving of x %. Inter-dependencies with other tools are also indicated.

Several SPSs can be signaled in the bitstream. They may include flags to control the tools at the sequence or at a scalability level.

Besides the SPSs, additional parameter sets, of lower level in the syntax (such as PPS, slice header, tiles group header, tiles header) can be specified. They may include additional flags to control the tools at the lower level than the sequence level.

In the following, syntax elements defined at the highest (SPS) level will use "hl_" as prefix. When prefix "ll_" is used, this indicates that the syntax elements are at a lower level than SPS, to control the tools more locally.

TABLE 2 list of tools considered in VTM3 and for further VTM.

| | Description | Inter-dependency to other tools (Y/N) | PSNR-Y BD-rate |
|---|---|---|---|
| Coding structure | | | |
| C_PR | Partition restriction avoiding redundant splits | N | 0.0 |
| C_FBP | Frame boundary partitioning | N | −0.4 |
| C_TT64 | Split restriction TT when size >64 | Y, should be grouped with other partition restrictions (C_TT64, C_QT128, C_BT ) | 0.0 |
| C_QT128 | Implicit split QT 128 × 128 to 64 × 64 in I slice | Y, should be grouped with other partition restrictions (C_TT64, C_QT128, C_BT ) | 0.0 |
| C_BT | Split constraint (L0081) on horiz BT for 64 × 128 | Y, should be grouped with other partition restrictions (C_TT64, C_QT128, C_BT ) | 0.0 |
| C_CST | Chroma separate tree | N, requires 2 modes in spec | −0.3 |
| Intra prediction | | | |
| A_67IPM | 67 intra pred mode | Y, requires more description in spec | −0.2 |
| A_WIP | Wide angle intra prediction | Y (A_67IPM) | −0.1 |
| A_6MPM | MPMs moved to 6 instead of 3 for HEVC | N | −0.1 |
| A_CCLM | Cross-component linear model | N | −1.0 |
| A_MDLM | Multi-directional LM | Y (A_CCLM) | 0.0 |
| A_MRLP | Multi-ref line prediction | Y (A_6MPM) | −0.2 |

TABLE 2-continued list of tools considered in VTM3 and for further VTM.

|  | Description | Inter-dependency to other tools (Y/N) | PSNR-Y BD-rate |
|---|---|---|---|
| A_PDPC | Position dependent prediction combination | Y (A_67IPM) | −0.6 |
| A_IRIP | Intra reference sample interpolation filter | N | −0.2 |
| A_CPR | Current picture referencing (intra block copy) | Could be dependent on C_CST | −0.2 ? |
| A_PM | Palette mode | Could be dependent on C_CST | Specific screen content |
| Inter prediction |  |  |  |
| R_HPMV | MVs defined with a precision of 1/16 | Y | ? |
| R_AMVR | Adaptive motion vector resolution | N | −1.4 |
| R_TMVP | Temporal MV Prediction | N | ? |
| R_ATMVP | Alternative temporal motion vector prediction | Y (TMVP) | −0.7 |
| R_HMVP | History based motion vectors list | N | −0.6 |
| R_MMVD | Merge with MVD aka Ultimate MV expression | Y (Perf depending on R_HPMV) | −1.3 |
| R_PAMC | Pairwise average merging candidates | Y (Perf depending on R_HPMV) | −0.4 |
| R_AFF | Affine motion model | Y (Perf depending on R_HPMV) | −3.8 |
| R_GBI | Generalized bi-pred | N (same type of tools as R_TRI, R_MH) | −0.7 |
| R_TRI | Triangular partitions | N (same type of tools as R_GBI, R_MH) | −0.6 |
| R_MH | Multi-hypothesis Combined merge/intra | N (same type of tools as R_GBI, R_TRI) | −0.5 |
| R_OBMC | Overlapped block motion compensation | N (weighting samples as R_GBI or R_TRI) | −1.0 ? |
| R_BIO | Bi-directional optical flow | N | −1.3 |
| R_PERP | PERP with horiz geometry padding of ref picts | N | −1.4 ? |
| R_DMVR | Decoder side motion vector refinement | Y (Perf depending on R_HPMV) Not compatible with R_BIO | −0.6 |
| R_WP | Weighted pred | N | Specific fading |
| R_LIC | Local illumination compensation | N | Specific vr360 |
| Loop filtering |  |  |  |
| L_DBF | Deblocking filter applying as 1st in-loop filter | N | ? |
| L_SAO | Sample adaptive offset | N | 0.7 |
| L_ALF | Adaptive loop filter | N | −4.7 |
| Transform |  |  |  |
| T_MTS_intra | Adaptive multi-core transform for intra CUs | N | −1.0 ? |
| T_MTS_inter | Adaptive multi-core transform for inter CUs | Y (T_MTS_intra) | −1.3 |
| T_ST | Secondary transforms | N | −1.0 ? |
| T_RTT | Recursive transform tree | Y (T_MTS) | −1.0 ? |
| Quantization |  |  |  |
| Q_DQ | Dependent quantization | Y (C_SDH deactivated) | −2.2 |
| Coefs coding |  |  |  |
| C_SDH | Sign data hiding | Y (works if Q_DQ deactivated and vice-versa) | −0.5 |

Figure 3:
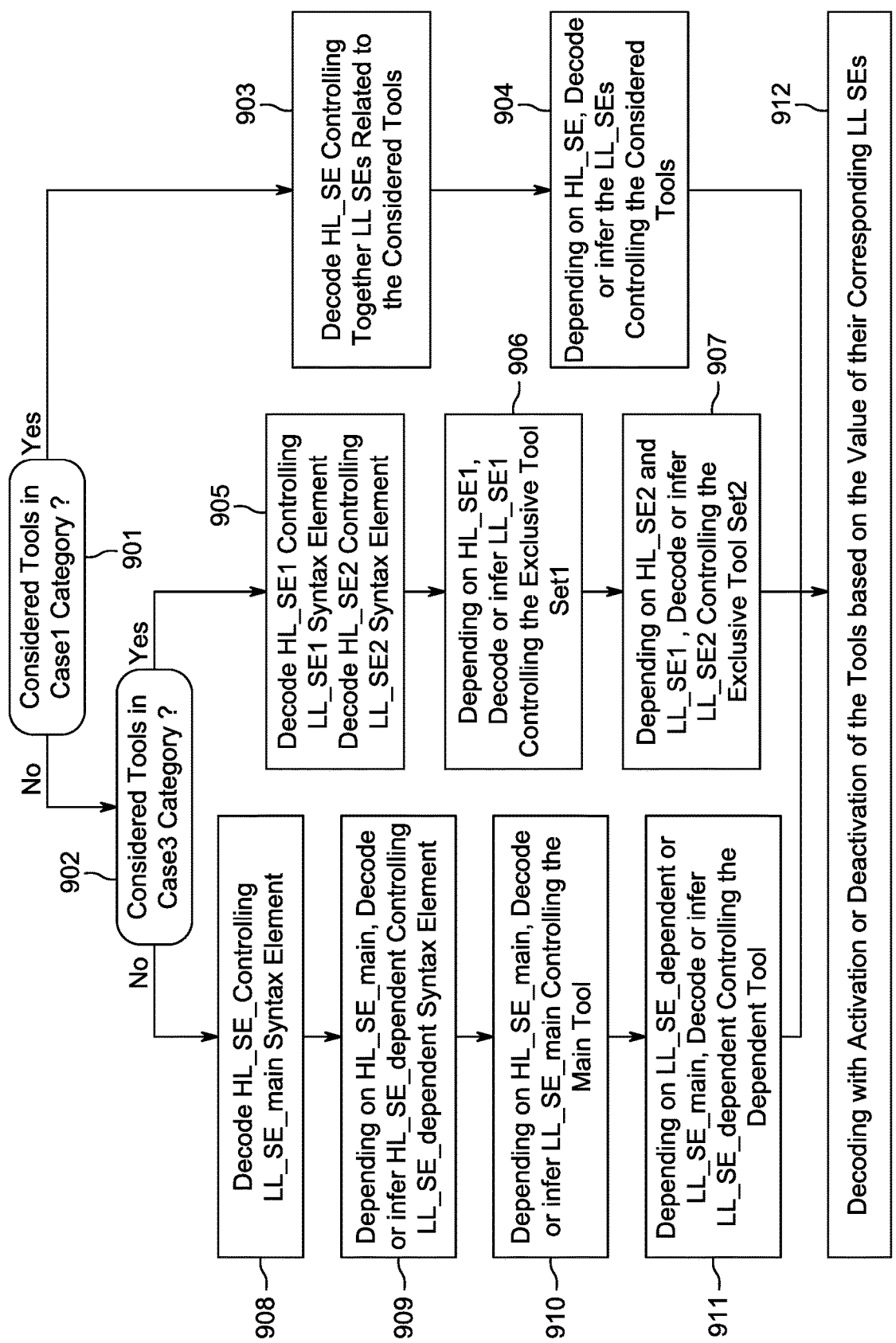
FIG. 3 shows a generic decoding process according to one embodiment.

From the analysis of the tools, the following characteristics are observed:

Case1—several tools are based on same conceptual design, which leads to control them together Case2—several tools are conditioned, either in terms of performance, or in terms of technical dependency, to others, which leads to control them based on the control of the tools they are conditioned to Case3—several are mutually exclusive, and cannot be activated together The following definitions are used in the rest of the document:

Considered tools—this relates to the set of tools controlled by the proposed process Main and Dependent tools—when the considered tools are in case2 category, they are split into two sets, main tools, and dependent tools, the activation/de-activation of the dependent tools being dependent on the activation/de-activation of the main tools Exclusive tools—when the considered tools are mutually exclusive (case3), they are grouped into "exclusive tools set 1", and "exclusive tools set 2", where when tools of set 1 are activated, tools of set 2 are de-activated, and vice-versa A generic block diagram of the decoding process, covering these 3 cases, is provided in FIG. 3. For sake of simplification, it is considered that two tools are being handled. The concept can be extended to more than two tools. The block diagram is basically made of three branches, depending on the type of the considered tools, which is checked in steps 901 and 902.

The branch corresponding to case1 is made of two main steps.

In step 903, at least one high-level syntax element HL_SE is decoded from the bitstream.

In step 904, depending on the value of HL_SE, low-level syntax elements controlling the considered tools are either inferred to a given value resulting in typically de-activating (alternatively activating) all the considered tools, or decoded from the bitstream (enabling controlling independently each one of the considered tools).

The branch corresponding to case3 is made of four main steps.

In step 905, at least two high-level syntax elements HL_SE1 and HL_SE2 related to the control of exclusive tools 1 and 2 are decoded from the bitstream.

In step 906, depending on the value of HL_SE1, at least one low-level syntax element LL_SE1 controlling the exclusive tool 1 is either decoded from the bitstream, or inferred to a given value typically resulting in de-activating exclusive tool 1.

In step 907, depending on the value of HL_SE2 and of LL_SE1, at least one low-level syntax element LL_SE2 controlling the exclusive tool 2 is either decoded from the bitstream, or inferred to a given value typically resulting in de-activating exclusive tool 2.

Step 907 is such that 1) if exclusive tool 1 is enabled (from LL_SE1), LL_SE2 value results in disabling exclusive tool 2, and
2) if exclusive tool 1 is disabled (from LL_SE1), exclusive tool 2 can be enabled.

The branch corresponding to case2 is made of four main steps.

In step 908, at least one high-level syntax element HL_SE_main is decoded from the bitstream.

In step 909, depending on the value of HL_SE_main, at least one high-level syntax element HL_SE_dependent controlling the dependent tool is either decoded from the bitstream, or inferred to a given value typically resulting in de-activating the dependent tool.

Step 909 is such that if HL_SE_main value results in disabling the main tool, then HL_SE_dependent value results in disabling the dependent tool In step 910, depending on the value of HL_SE_main, at least one low-level syntax element LL_SE_main controlling the main tool is either decoded from the bitstream, or inferred to a given value typically resulting in de-activating the main tool.

In step 911, depending on the value of HL_SE_dependent and of LL_SE_main, at least one low-level syntax element LL_SE_dependent controlling the dependent tool is either decoded from the bitstream, or inferred to a given value typically resulting in de-activating dependent tool.

Step 911 is such that if HL_SE_dependent results in disabling the dependent tool or if LL_SE_main results in disabling the main tool, then LL_SE_dependent results in disabling the dependent tool The last step 912 corresponds to applying the decoder process, with the activation/de-activation of the tools controlled by the low syntax elements derived from the previous steps.

The following sections correspond to embodiments for the different considered tools cases.

General Solution for Case 1 (Tools Based on Same Conceptual Design)

The solution for case 1 is to define a high-level syntax element that controls several tools. Additional low-level syntax elements related to the activation/de-activation of those tools are also defined. Depending on the value of the high-level syntax element, the additional low-level syntax elements are either set to a given pre-defined value or read from the bitstream. The decoding process is then performed with the activation or de-activation of those tools depending on the value of their corresponding low-level syntax elements.

Figure 4:
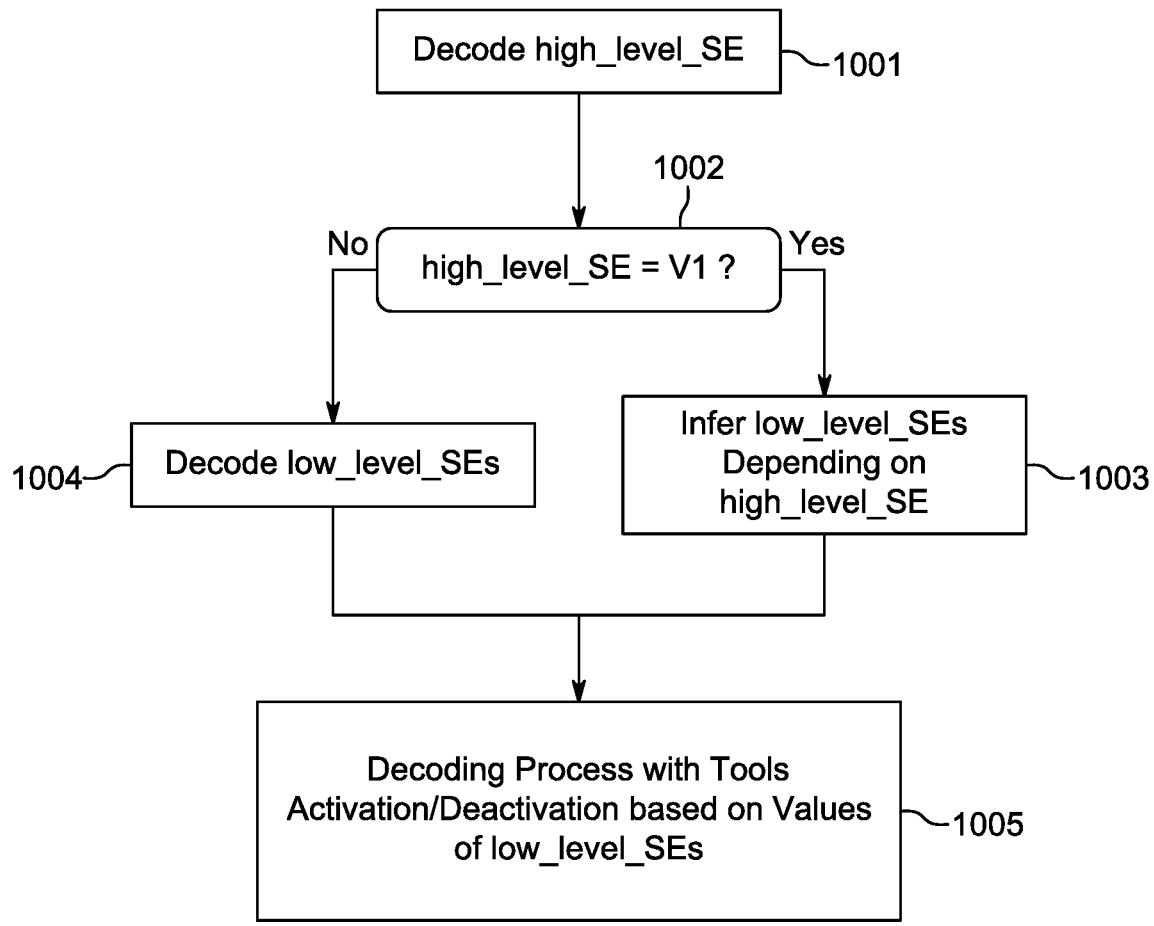
FIG. 4 shows a generic decoding process for Case1.

The process is summarized as follows (also depicted in FIG. 4):

Decode from the bitstream one high-level syntax element high_level_SE (1001)

If high_level_SE is equal to a given value V1 (1002)

infer low-level syntax elements (low_level_SEs) related to the tools activation/deactivation based on the value of high_level_SE (1003)

Otherwise (1002)

Decode from the bitstream low_level_SEs (1004)

Apply the decoding process with the tools activated/deactivated depending on the value of their low-level syntax elements low_level_SEs (1005)

General Solution for Case 2 (Tools Dependent on Other Tools)

A solution for Case 2 involves that the activation of some tools (let's name them dependent tools) may be conditioned by the activation of other tools (let's name them main tools). As in Case1, the tools can be controlled by one single high-level flag, that controls both the activation of the main and dependent tools. Then low-level syntax elements of dependent tools are conditioned by the value of the low-level syntax elements controlling the main tools.

Figure 5:
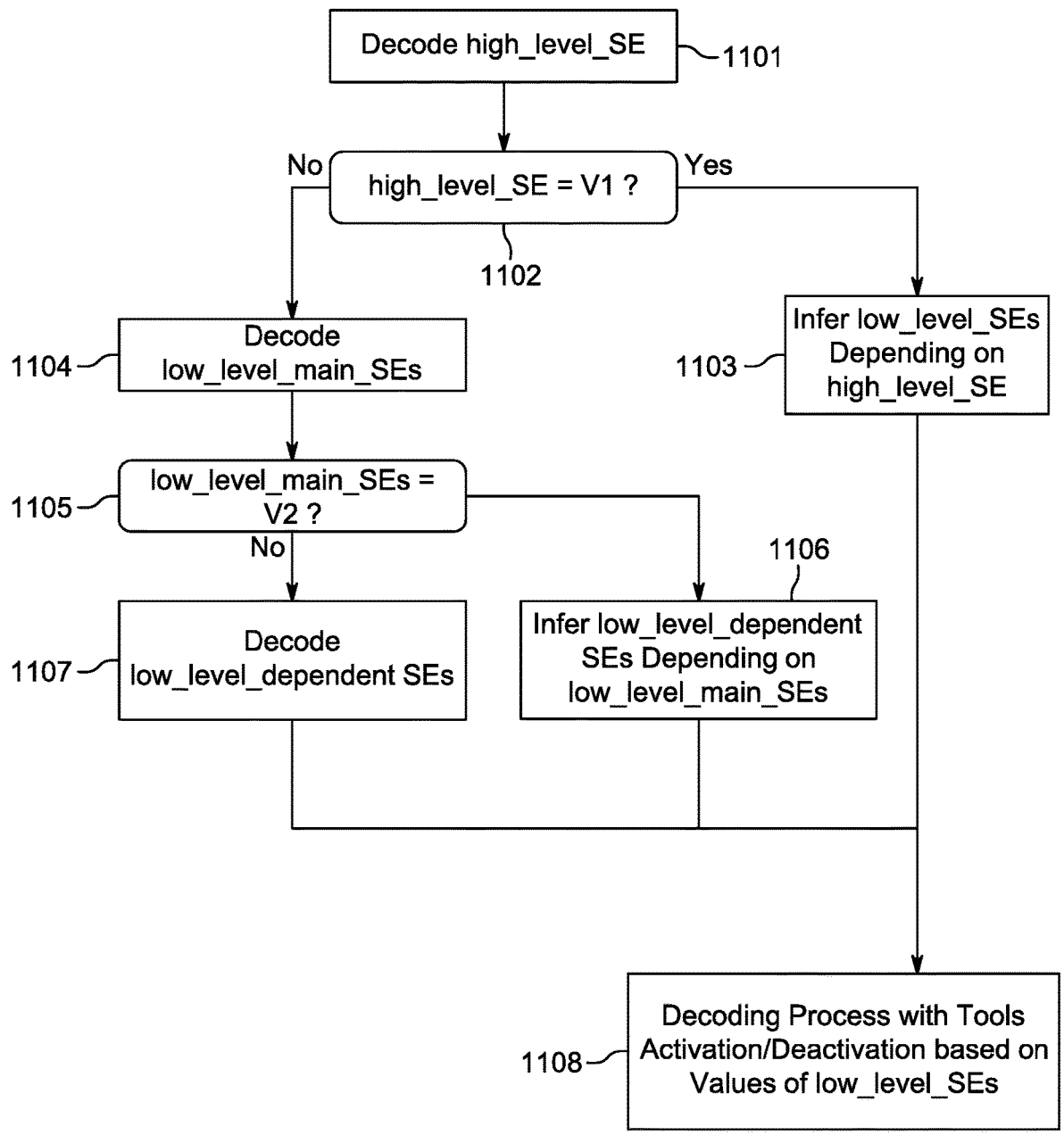
FIG. 5 shows a first proposed generic decoding process for Case2.

The process is summarized as follows (also depicted in FIG. 5):

Decode from the bitstream one high-level syntax element high_level_SE (1101)

If high_level_SE is equal to a given value V1 (1102)

infer low-level syntax elements (low_level_main_SEs and low_level_dependent_SEs) related to the main and dependent tools activation/deactivation depending on the value of high_level_SE (1103)

Otherwise (1102)

Decode from the bitstream low-level syntax elements (low_level_main_SEs) related to the main tools activation/deactivation (1104)

If the low_level_main_SEs are equal to a given value V2 (1105)

infer low-level syntax elements (low_level_dependent_SEs) related to the dependent tools activation/deactivation depending on the value if the low-level syntax elements related to the main tools activation/deactivation low_level_main_SEs (1106)

Otherwise (1105)

Decode from the bitstream low-level syntax elements (low_level_dependent_SEs) related to the dependent tools activation/deactivation (1107)

Apply the decoding process with the tools activated/deactivated depending on the value of their low-level syntax elements (low_level_main_SEs and low_level_dependent_SEs) (1108)

Alternatively, at least two high-level flags are used, one to control the main tools activation, one to control the dependent tools activation, this second one being conditioned by the value of the first one.

Figure 6:
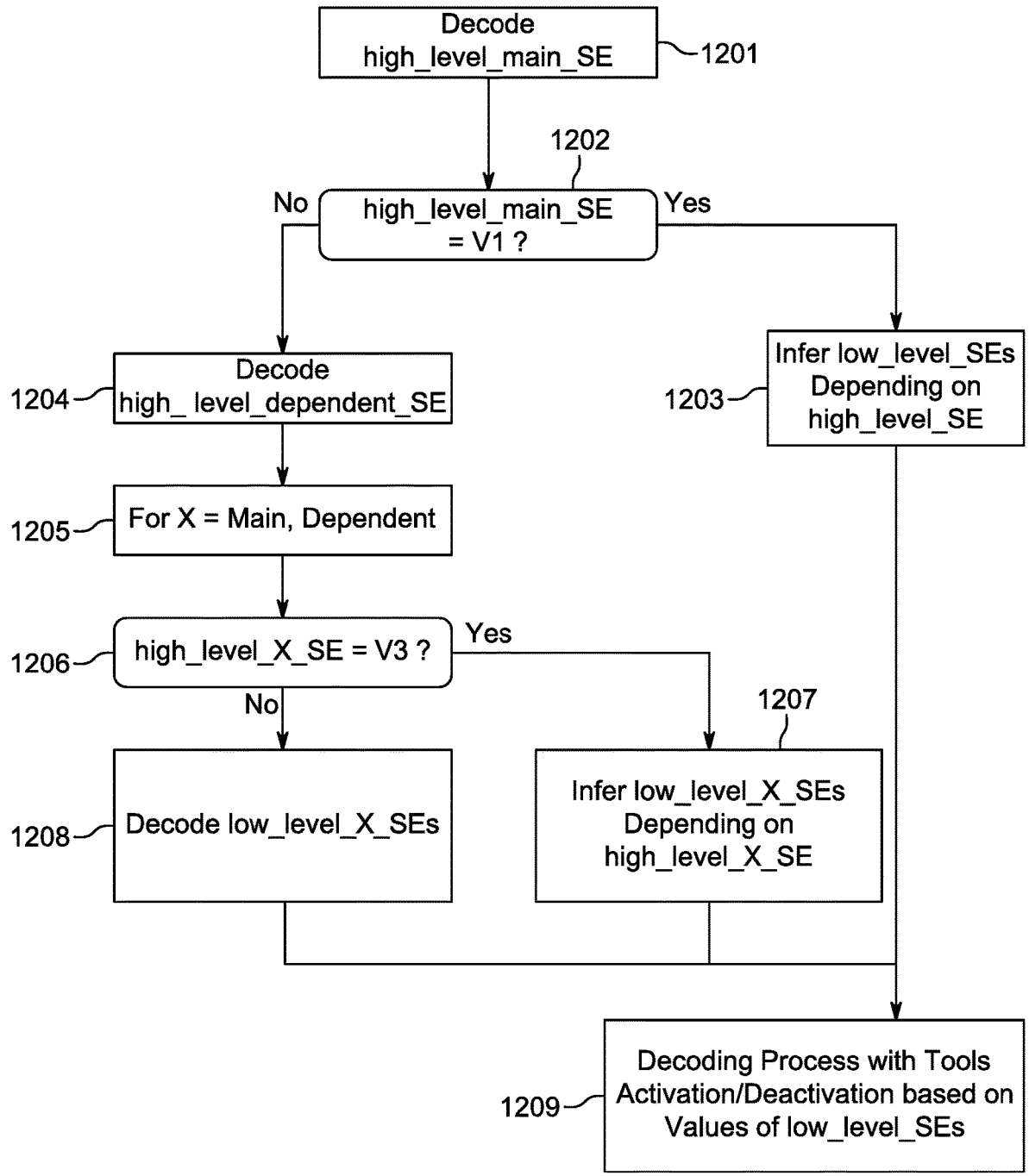
FIG. 6 shows a second proposed generic decoding process for Case2.

The process is summarized as follows (also depicted in FIG. 6):
- Decode from the bitstream one high-level syntax element related to the main tools activation/deactivation (1201)
- If the high-level syntax element related to the main tools activation/deactivation has a given value V1 (1202)
  - infer the high-level syntax element related to the dependent tools activation/deactivation depending on the value of the high-level syntax element related to the main tools activation/deactivation (1203)
- Otherwise (1202)
  - Decode from the bitstream the high-level syntax element related to the dependent tools activation/deactivation (1204)
- For the main or the dependent tools (1205), the following applies:
  - If the high-level syntax element has a given value V3 (that may be different for the main and for the dependent tools) (1206)
    - infer low-level syntax elements related to the tools activation/deactivation depending on the value of the high-level syntax element (1207)
  - Otherwise (1206)
    - Decode from the bitstream low-level syntax elements related to the tools activation/deactivation (1208)
- Apply the decoding process with the tools activated/deactivated depending on the value of their low-level syntax elements (1209)

General Solution for Case 3 (Tools Mutually Exclusive)

The solution for case 3 is to define at least one high-level syntax element controlling one first tool or one first set of tools, and a parameter for controlling one second tool or one second set of tools mutually exclusive with the first tool or first set of tools.

Figure 7:
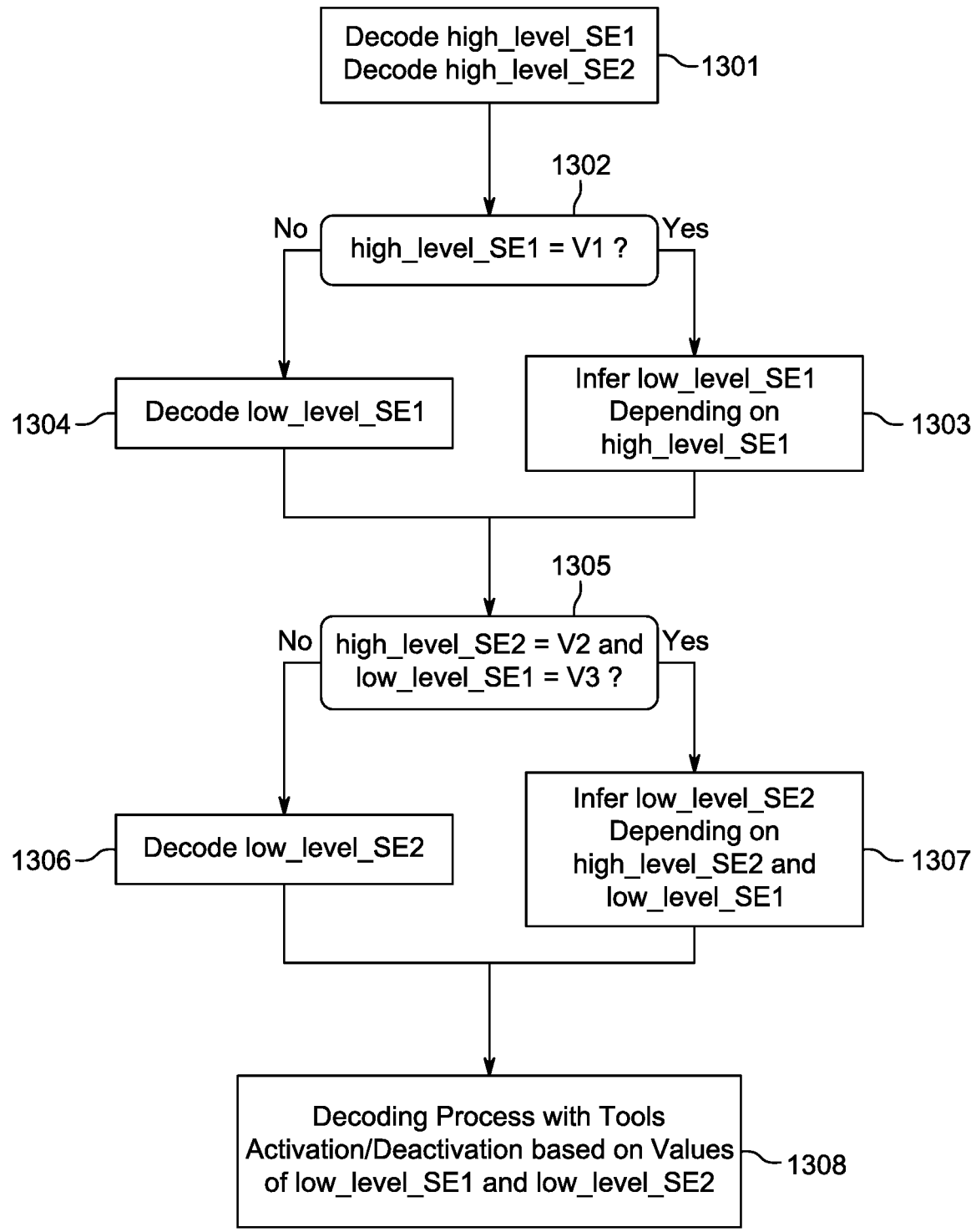
FIG. 7 shows a generic decoding process for Case3.

The process is summarized as follows (also depicted in FIG. 7):
- Decode from the bitstream two high-level syntax element high_level_SE1 and high_level_SE2 related to one first set of tools and one second set of tools (1301)
- If high_level_SE1 is equal to a given value V1 (1302)
  - Infer low-level syntax elements (low_level_SE1s) related to the first set of tools activation/deactivation based on the value of high_level_SE1 (1303)
- Otherwise (1302)
  - Decode from the bitstream low_level_SE1 (1304)
- If high_level_SE2 is equal to a given value V2 and low_level_SE1 is equal to a given value V3 (1305)
  - Infer low-level syntax elements (low_level_SE2) related to the second set of tools activation/deactivation based on the value of highLevelParam2 (1306)
- Otherwise (1305)
  - Decode from the bitstream low_level_SE2s (1307)
- Apply the decoding process with the tools activated/deactivated depending on the value of their low-level syntax elements low_level_SE1 and low_level_SE2 (1308)

Advantageously, the invention enables reducing the complexity of encoder and decoder, by limiting the number of possible combinations of tools. It also allows reducing the risk of implementation issues due to the need to support tools combinations involving added complexity issues and added tools incompatibility cases. It finally reduces the interoperability issues, which could be involved by enabling too many possible tools combinations.

For these different cases, embodiments specific to tools listed in Table 2 are provided (case indicated in parenthesis in the embodiment titles).

Embodiment 1—Joint Control of Partitioning Restrictions (Case1)

Main Embodiment

In an embodiment, multiple partitioning restrictions, related to partitioning (or coding structure) of CTUs or CUs with at least one of the vertical or horizontal dimensions larger than a given limit (typically 64), are controlled by one single high-level syntax element (e.g. hl_picture_partitioning_restrictions_flag) inserted in a high-level parameter set (e.g. SPS).

| seq_parameter_set_rbsp( ) { | Descriptor |
|---|---|
| ... | |
| hl_picture_partitioning_restrictions_flag | u(1) |
| ... | |

In addition, in a parameter set of lower level than the high-level parameter set (e.g. PPS, slice header, tiles group header, tile header), syntax elements related to specific partitioning restrictions are inserted.

As an example, specific partitioning restrictions can be the following tools described in Table 2: C_TT64, C_QT128, C_BT, controlled respectively by the following low level flags, ll_split_tt128_restriction_flag, ll_split_qt128_restriction_flag, ll_split_bt128_restriction_flag.

As an example, the following specific syntax elements are inserted in the tiles group header:

| tiles_group_header( ) { | Descriptor |
|---|---|
| ... | |
| if ( !hl_picture_partitioning_restrictions_flag ) { | |
|    ll_split_tt128_restriction_flag | u(1) |
|    ll_split_qt128_restriction_flag | u(1) |
|    ll_split_bt128_restriction_flag | u(1) |
| } | |
| ... | |

Figure 8:
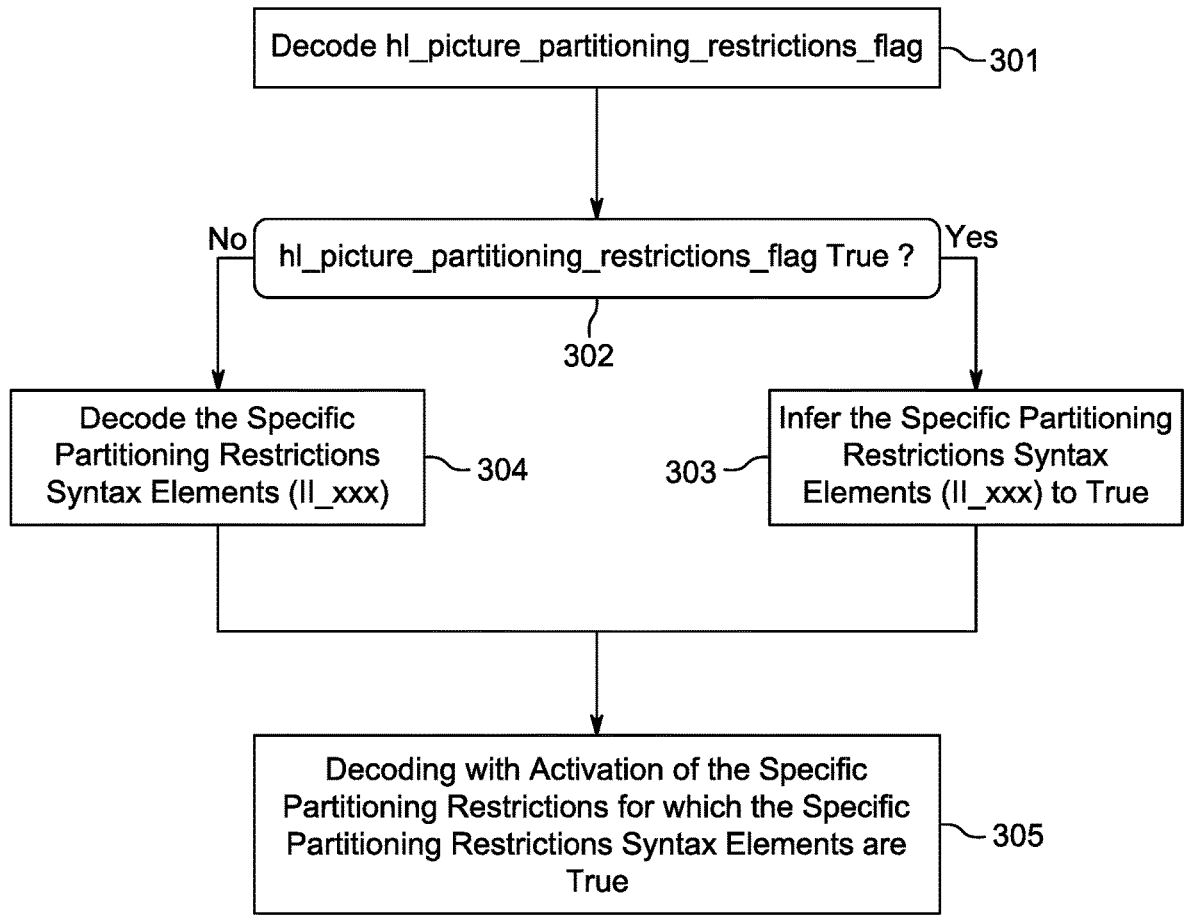
FIG. 8 shows an example decoding process based on picture partitioning restrictions signaling.

A simplified decoding process block diagram is depicted in FIG. 8. In step 301, the high-level partitioning restrictions flag hl_picture_partitioning_restrictions_flag is decoded from the bitstream. Its value is checked in step 302. If hl_picture_partitioning_restrictions_flag is true, the specific low-level syntax elements related to the specific partitioning restrictions are set to true (step 303). If the flag is false, the specific low-level syntax elements related to the specific partitioning restrictions are decoded in step 304. In step 305, the decoding process of CTUs or CUs is applied, with the specific partitioning restrictions controlled by the low-level syntax elements either set in step 303 or decoded in step 304. The corresponding semantics are one example:

hl_picture_partitioning_restrictions_flag equal to 1 specifies that the syntax elements ll_split_tt128_restriction_flag, ll_split_qt128_restriction_flag and ll_split_bt128_ restriction_flag are not present in tiles group header of pictures in the CVS. hl_picture_partitioning_restrictions_flag equal to 0 specifies that the syntax elements ll_split_tt128_restriction_flag, ll_split_qt128_restriction_flag and ll_split_bt128_restriction_flag are present in tiles group header of pictures in the CVS. ll_split_tt128_restriction_flag equal to 1 specifies that the ternary tree split is disabled when the CU size is larger than 64×64. ll_split_tt128_restriction_flag equal to 0 specifies that the ternary tree split is enabled when the CU size is larger than 64×64. When ll_split_tt128_restriction_flag is not present, it is set equal to 1.

ll_split_qt128_restriction_flag equal to 1 specifies that the CUs of size 128×128 are forced to be split into four CUs of size 64×64. ll_split_qt128_restriction_flag equal to 0 specifies that the CUs of size 128×128 are not forced to be split into four CUs of size 64×64. When ll_split_qt128_restriction_flag is not present, it is set equal to 1.

ll_split_bt128_restriction_flag equal to 1 specifies that CUs of size 64×128 are forced to be split into two CUs of size 64×64. ll_split_bt128_restriction_flag equal to 0 specifies that CUs of size 64×128 are not forced to be split into two CUs of size 64×64. When ll_split_bt128_restriction_flag is not present, it is set equal to 1.

Alternative 1

Figure 9:
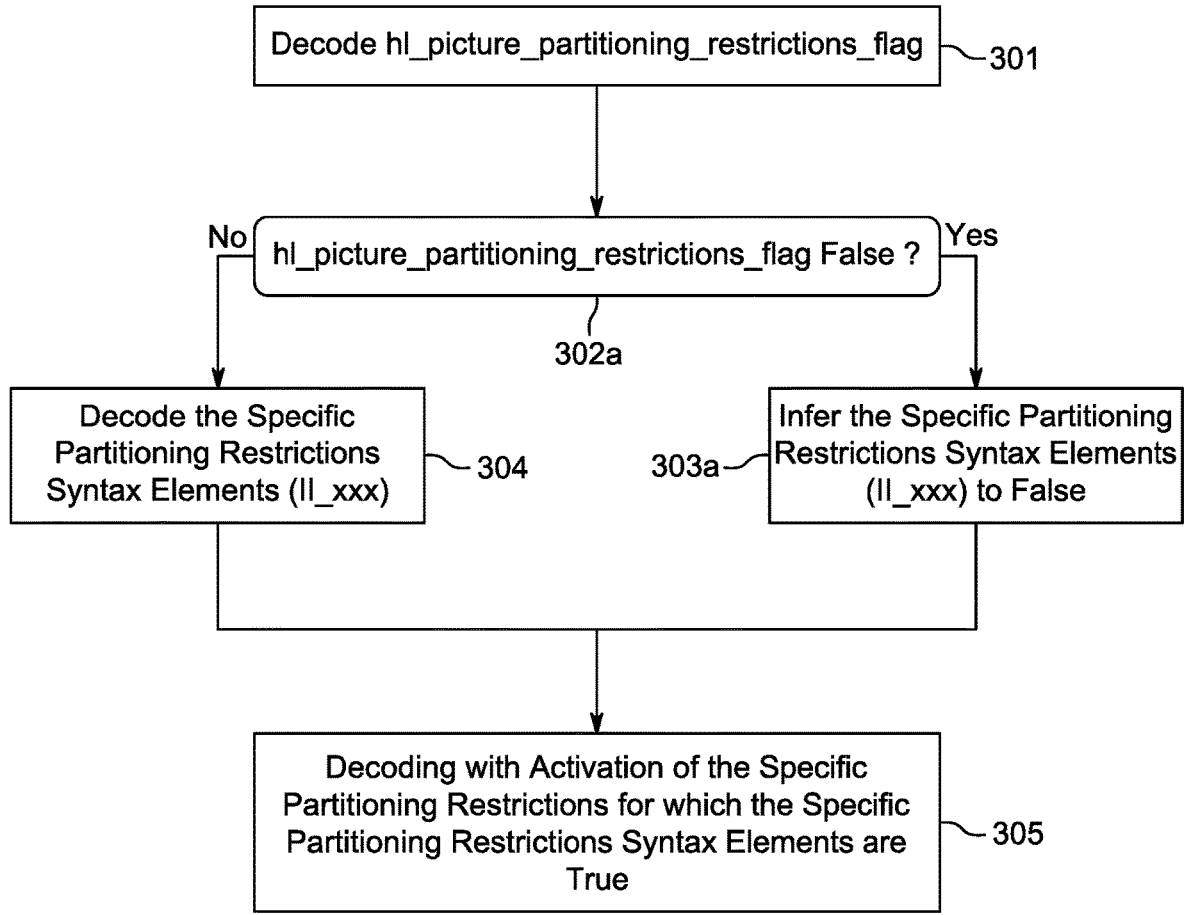
FIG. 9 shows an alternate decoding process based on picture partitioning restrictions signaling.

In the solution described above, the high-level control of the partitioning restrictions favors the activation of the restrictions, since hl_picture_partitioning_restrictions_flag equal to true involves that the specifics partitioning restrictions flag are also set to true. In the following embodiment, the approach is inverted. When hl_picture_partitioning_restrictions_flag is equal to false, the specific partitioning restrictions flag are also set to false. Otherwise, these specific partitioning restrictions flag are read from the bitstream. This is shown in FIG. 9 where the condition on the value of the global flag hl_picture_partitioning_restrictions_flag is inversed compared to the embodiment above. Step 302a checks if hl_picture_partitioning_restrictions_flag is equal to false. If this condition is true, in step 303a, the specific low-level syntax elements related to the specific partitioning restrictions are set to false. The other steps are the same as in the previous embodiment.

Embodiment 2

In an embodiment, multiple high-level partitioning restrictions flags (N) are present in the syntax, and semantics enable to control them sequentially, as described in the following. In this example, the flags are generically named "hl_picture_partitioning_restrictionk_flag", where k is an integer value. And low-level flags are additionally inserted at a lower level in the syntax, e.g. tiles group header, named "ll_picture_partitioning_restrictionk_kk_flag", where kk is an integer value. For a given restriction k, the high-level flag "hl_picture_partitioning_restrictionk_flag", controls Mk low-level restrictions, controlled by the flag "ll_picture_partitioning_restrictionk_kk_flag", kk=1 to Mk.

| seq_parameter_set_rbsp( ) { | Descriptor |
|---|---|
| ... | |
| hl_picture_partitioning_restriction1_flag | u(1) |
| if( !hl_picture_partitioning_restriction1_flag ) { | |
| hl_picture_partitioning_restriction2_flag | u(1) |
| if( !hl_picture_partitioning_restriction2_flag ) | |
| { | |
| hl_picture_partitioning_restriction3_flag | u(1) |
| } | |
| } | |
| ... | |

The corresponding semantics are an example:

hl_picture_partitioning_restrictionk_flag equal to 1 specifies that the syntax elements ll_picture_partitioning_restrictionka_flag, ll_picture_partitioning_restrictionkb_flag are not present in tiles group header of pictures in the CVS. hl_picture_partitioning_restriction1_flag equal to 0 specifies that the syntax elements ll_picture_partitioning_restriction1a_flag, ll_picture_partitioning_restriction1b_flag are present in tiles group header of pictures in the CVS In this example, the same semantics applies to hl_picture_partitioning_restrictionk_flag for any k from 1 to N.

ll_picture_partitioning_restrictionkx_flag equal to 1 specifies that the picture partitioning restriction kx is enabled. ll_picture_partitioning_restrictionkx_flag equal to 0 specifies that the picture partitioning restriction kx is disabled. When ll_picture_partitioning_restrictionkx_flag is not present, it is set equal to 1.

In this example, the same semantics applies to ll_picture_partitioning_restrictionkx_flag for any kk from 1 to Mk.

This may more specifically relate to the partitioning restrictions identified in the Table 2 as C_TT64, C_QT128, C_BT.

Embodiment 3—Joint Control of Other Tools Related to Partitioning (Case1)

The same approach can be applied to the tools related to the following partitioning-related tools described in Table 2: C_PR, C_FBP.

The detailed syntax & semantics can be as done above.

Embodiment 4—Control of Multi-Hypothesis Prediction Tools (Case1)

Main Embodiment

In an embodiment, inter prediction tools based on multi-hypothesis prediction are controlled by one high level single syntax element (e.g. hl_multi_hypothesis_enable_flag) inserted in a high-level parameter set (e.g. SPS). In the current document, a multi-hypothesis prediction tool involves weighted mixing of samples coming from several predictions, with spatially varying weights.

| seq_parameter_set_rbsp( ) { | Descriptor |
|---|---|
| ... | |
| hl_multi_hypothesis_flag | u(1) |
| ... | |

In addition, in a parameter set of lower level than the high-level parameter set (e.g. PPS, slice header, tiles group header, tile header), syntax elements related to specific multi-hypothesis prediction tools are inserted.

As an example, specific multi-hypothesis prediction tools can be the following tools described in Table 2: R_GBI, R_TRI, R_MH, controlled respectively by the following low level flags, ll_generalized_bipred_enable_flag, ll_triangular_partition_enable_flag, ll_multi_hypothesis_intra_inter_enable_flag. Additionally, R_OBMC can also be included in this set of tools, controlled by a specific flag e.g. ll_obmc_enable_flag.

As an example, the following specific syntax elements can be inserted in the tiles group header:

| tiles_group_header( ) { | Descriptor |
|---|---|
| ... | |
| if ( hl_multi_hypothesis_enable_flag ) { | |
| ll_generalized_bipred_enable_flag | u(1) |
| ll_triangular_partition_enable_flag | u(1) |
| ll_multi_hypothesis_intra_inter_enable_flag | u(1) |
| ll_obmc_enable_flag | u(1) |
| } | |
| ... | |

Figure 10:
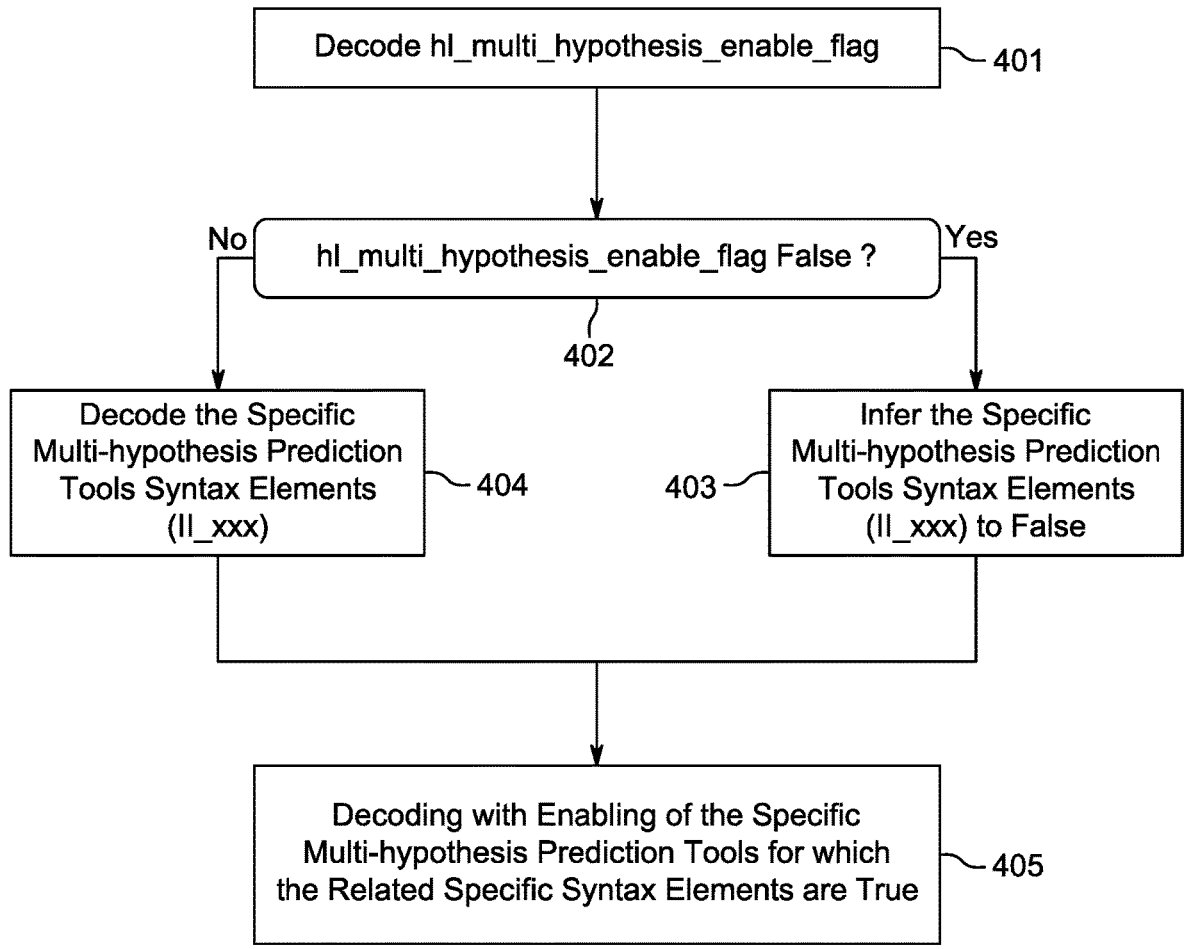
FIG. 10 shows an example decoding process based on multi-hypothesis prediction enabling flags signaling.
Figure 11:
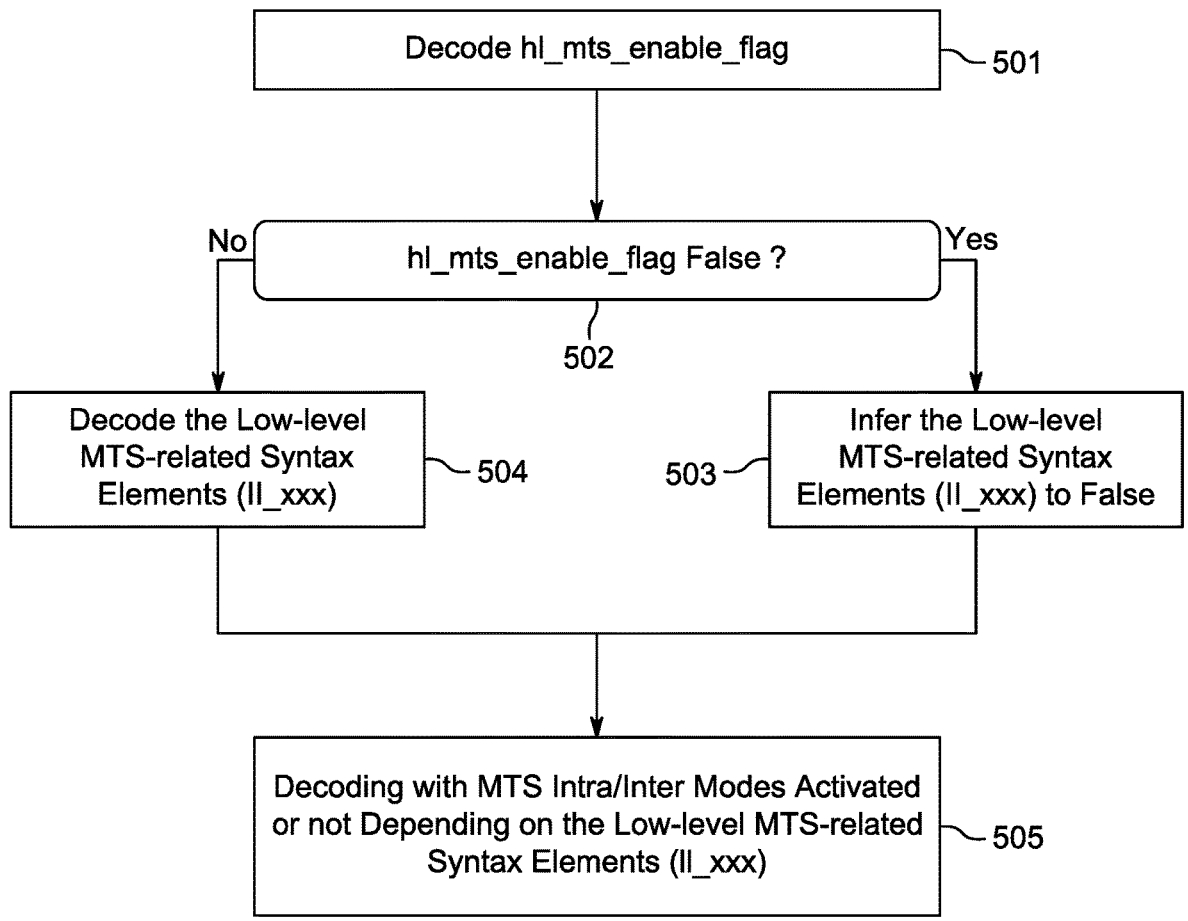
FIG. 11 shows an example decoding process based on MTS (Multiple Transform Set) enabling flags signaling.

A simplified decoding process block diagram is depicted in FIG. 10. In step 401, the flag hl_multi_hypothesis_enable_flag is decoded from the bitstream. Its value is checked in step 402. If the flag is true, the specific syntax elements related to the specific multi-hypothesis prediction tools are set to true (step 403). If hl_multi_hypothesis_enable_flag is true, the specific low-level syntax elements related to the specific multi-hypothesis prediction tools are decoded in step 404. In step 405, the decoding process of CTUs or CUs is applied, with the specific multi-hypothesis prediction tools controlled by the low-level syntax elements either set in step 403 or decoded in step 404.

The corresponding semantics are one example:
hl_multi_hypothesis_enable_flag equal to 1 specifies that the syntax elements ll_generalized_bipred_enable_flag, ll_triangular_partition_enable_flag, ll_multi_hypothesis_intra_inter_enable_flag, ll_obmc_enable_flag are present in tiles group header of pictures in the CVS. hl_multi_hypothesis_enable_flag equal to 0 specifies that the syntax elements ll_generalized_bipred_enable_flag, ll_triangular_partition_enable_flag, ll_multi_hypothesis_intra_inter_enable_flag, ll_obmc_enable_flag are not present in tiles group header of pictures in the CVS. ll_generalized_bipred_enable_flag equal to 1 specifies that the generalized bi-prediction mode is enabled. ll_generalized_bipred_enable_flag equal to 0 specifies that the generalized bi-prediction mode is disabled. When ll_generalized_bipred_enable_flag is not present, it is set equal to 0.

An equivalent semantics is applied to the syntax elements ll_triangular_partition_enable_flag, ll_multi_hypothesis_intra_inter_enable_flag, ll_obmc_enable_flag.

Alternative

As in the previous section, in an alternate solution, multiple high-level multi-hypothesis prediction enabling flags are present in the syntax, and semantics enable to control them together.

The detailed syntax & semantics can be done as in the previous section.

Embodiment 5—Control of MTS Intra and Inter (Case2)

In an embodiment, one or two flags are inserted at a high-level to control the MTS (Multiple Tranform Set) activation. This relates to the following tools described in Table 2: T_MTS_intra, T_MTS_inter. Possibly T_ST can also be controlled by the same mechanism.

Solution 1

In a first example, one single high-level flag hl_mts_enable_flag is added, as illustrated in the table below.

| seq_parameter_set_rbsp( ) { | Descriptor |
|---|---|
| ... | |
| hl_mts_enable_flag | u(1) |
| ... | |

Depending on the value of the flag hl_mts_enable_flag, one or two additional flags are inserted at a lower-level to control the MTS activation for intra or inter regions such as slices, tiles groups, or tiles, as illustrated in the table below.

| tiles_group_header( ) { | Descriptor |
|---|---|
| ... | |
| if ( hl_mts_enable_flag ) { | |
| ll_mts_intra_enable_flag | u(1) |
| ll_mts_inter_enable_flag | u(1) |
| } | |
| ... | |

The decoding process is conceptually similar to the one described for the control of the multi-hypothesis prediction tools.

The corresponding semantics is suggested.

hl_mts_enable_flag equal to 1 specifies that the syntax elements ll_mts_intra_enable_flag and ll_mts_inter_enable_flag are present in tiles group header of pictures in the CVS. hl_mts_enable_flag equal to 0 specifies that the syntax elements ll_mts_intra_enable_flag and ll_mts_inter_enable_flag are not present in tiles group header of pictures in the CVS.

ll_mts_intra_enable_flag equal to 1 specifies that the multiple transform set mode is enabled for CUs coded in intra mode. ll_mts_intra_enable_flag equal to 0 specifies that the multiple transform set mode is disabled for CUs coded in intra mode. When ll_mts_intra_enable_flag is not present, it is set equal to 0.

ll_mts_inter_enable_flag equal to 1 specifies that the multiple transform set mode is enabled for CUs coded in inter mode. ll_mts_inter_enable_flag equal to 0 specifies that the multiple transform set mode is disabled for CUs coded in inter mode. When ll_mts_inter_enable_flag is not present, it is set equal to 0.

Solution 2

A second example is based on the first example. In addition, the low-level flag controlling the activation of MTS for inter is conditioned to the activation of MTS for intra. This may be expressed as follows.

| tiles_group_header( ) { | Descriptor |
|---|---|
| ... | |
| if ( hl_mts_enable_flag ) { | |
| ll_mts_intra_enable_flag | u(1) |
| if (ll_mts_intra_enable_flag ) { | |
| ll_mts_inter_enable_flag | u(1) |
| } | |
| ... | |

Alternatively, a similar behavior can be achieved by two high-level flags, as shown in the table below.

| seq_parameter_set_rbsp( ) { | Descriptor |
|---|---|
| ... | |
| hl_mts_intra_enable_flag | u(1) |
| if ( hl_mts_intra_enable_flag ) { | |
| hl_mts_inter_enable_flag | u(1) |
| } | |
| ... | |

The corresponding semantics are one example.

hl_mts_intra_enable_flag equal to 1 specifies that the syntax element ll_mts_intra_enable_flag is present in tiles group header of pictures in the CVS. hl_mts_intra_enable_flag equal to 0 specifies that the syntax element ll_mts_intra_enable_flag is not present in tiles group header of pictures in the CVS. hl_mts_inter_enable_flag equal to 1 specifies that the syntax element ll_mts_inter_enable_flag is present in tiles group header of pictures in the CVS. hl_mts_inter_enable_flag equal to 0 specifies that the syntax element ll_mts_inter_enable_flag is not present in tiles group header of pictures in the CVS. When hl_mts_inter_enable_flag is not present, it is set equal to 0.

ll_mts_intra_enable_flag equal to 1 specifies that the multiple transform set mode is enabled for CUs coded in intra mode. ll_mts_intra_enable_flag equal to 0 specifies that the multiple transform set mode is disabled for CUs coded in intra mode. When ll_mts_intra_enable_flag is not present, it is set equal to 0.

ll_mts_inter_enable_flag equal to 1 specifies that the multiple transform set mode is enabled for CUs coded in inter mode. ll_mts_inter_enable_flag equal to 0 specifies that the multiple transform set mode is disabled for CUs coded in inter mode. When ll_mts_inter_enable_flag is not present, it is set equal to 0.

Figure 12:
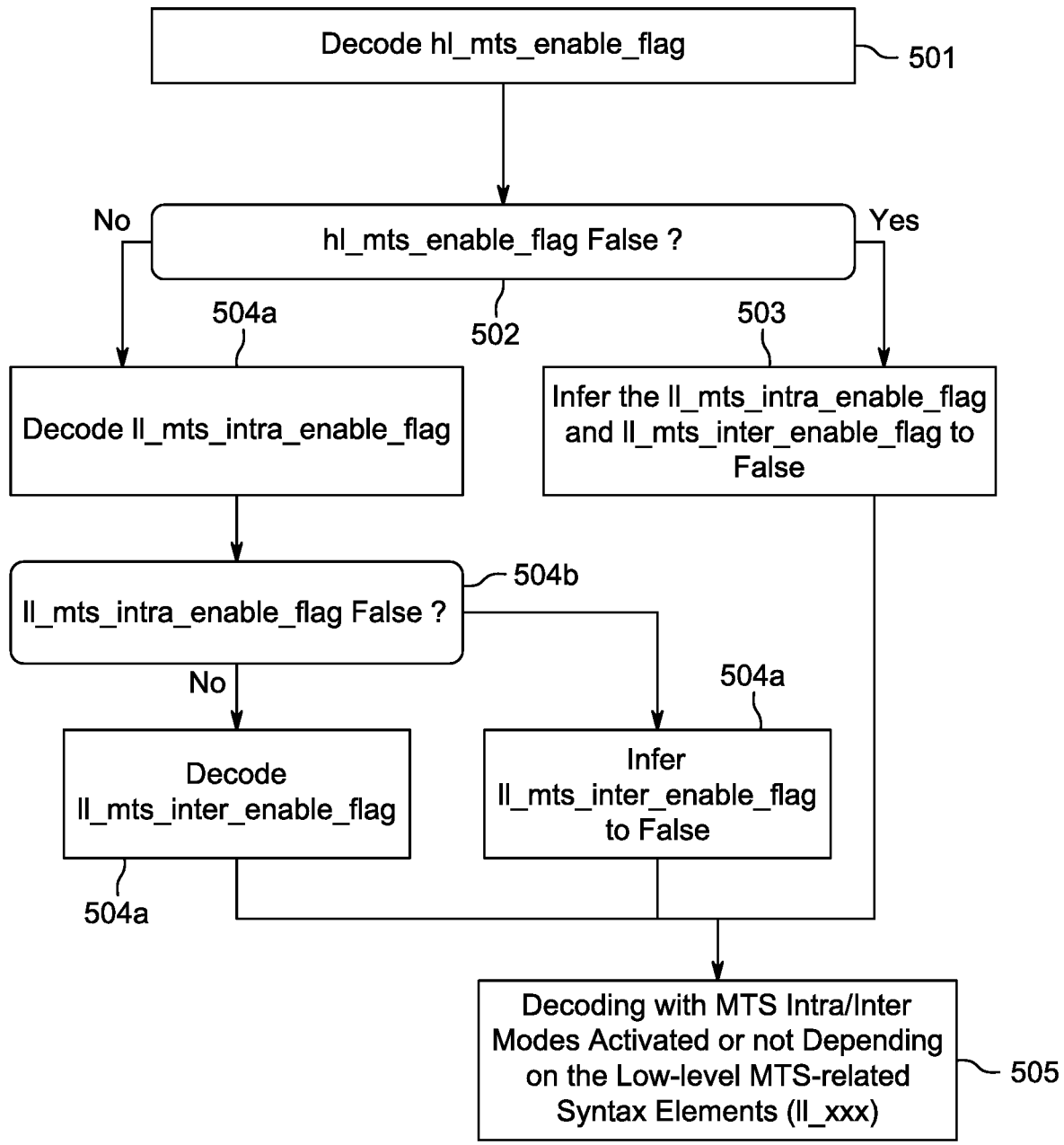
FIG. 12 shows an example alternate decoding process based on MTS enabling flags signaling.

The corresponding decoding process block diagram is depicted in FIG. 12.

Secondary Transform Activation Dependent on MTS Activation

In an embodiment, the activation of the secondary transform mode (T_ST) is conditioned by the activation of the MTS mode. This may be expressed as follows.

| tiles_group_header( ) { | Descriptor |
|---|---|
| . . . | |
| if ( hl_mts_enable_flag ) { | |
|   ll_mts_intra_enable_flag | u(1) |
|   if (ll_mts_intra_enable_flag ) { | |
|     ll_mts_inter_enable_flag | u(1) |
|     ll_secondary_transform_enable_flag | u(1) |
|   } | |
| . . . | |

Similarly, the activation of the recursive transform tree mode (T_RTT) is conditioned by the activation of the MTS mode.

Embodiment 6—Control of A_MDLM Based on A_CCLM Activation (Case2)

In an embodiment, the mechanism described for the MTS case applies for the case of the tools A_CCLM and A_MDLM described in Table 2, the activation/deactivation of A_MDLM being conditioned to the activation/deactivation of A_CCLM.

The detailed syntax & semantics can be done as above.

Embodiment 7—Control of ATMVP Based on ATMVP Activation (Case2)

In an embodiment, the mechanism described for the MTS case applies for the case of the tools R_TMVP and R_ATMVP described in Table 2, the activation/deactivation of R_ATMVP being conditioned to the activation/deactivation of R_TMVP. The detailed syntax & semantics can be done as above.

Embodiment 8—Control of Inter Tools Based on High-Precision MV Coding Activation (Case2)

In an embodiment, the activation/deactivation of R_AFF is conditioned to the activation/deactivation of R_HPMV, with implementations similar to the ones described for the MTS case.

The detailed syntax & semantics can be done as above.

In another embodiment, the activation/deactivation of R_MMVD, R_DMVR is conditioned to the activation/deactivation of R_HPMV, with implementations similar to the ones described for the MTS case The detailed syntax & semantics can be done as above.

In another embodiment, the activation/deactivation of R_PAMC is conditioned to the activation/deactivation of R_HPMV, with implementations similar to the ones described for the MTS case. The detailed syntax & semantics can be done as above.

Embodiment 9—Dependence of Palette Mode and of Current Picture Referencing on the Activation of Separate Luma/Chroma Tree (Case2)

It is observed that the palette mode highly benefits from the activation of the usage of separate luma/chroma tree.

In an embodiment, the activation/deactivation of A_PM and A_CPR are conditioned to the activation/deactivation of C_CST, with implementations similar to the ones described for the MTS case. The detailed syntax & semantics can be done as above.

Embodiment 10—Mutual Control of Dependent Quantization and Sign Data Hiding Tools (Case3)

It is observed that the tools dependent quantization (Q_DQ) and sign data hiding (C_SDH) are difficult to make working together.

In an embodiment, the high-level syntax control of Q_DQ and C_SDH is designed to avoid the mutual usage of these two tools.

Two high-level flags hl_dependent_quant_enable_flag and hl_sign_data_hiding_flag are added, as illustrated in the table below.

| seq_parameter_set_rbsp( ) { | Descriptor |
|---|---|
| . . . | |
| hl_dependent_quant_enable_flag | u(1) |
| hl_sing_data_hiding_enable_flag | u(1) |
| . . . | |

The low-level activation syntax elements related to the two tools are then set based on the value of hl_dependent_quant_enable_flag and hl_sign_data_hiding_flag. But one of flag controlling one given tool is read only if the other flag indicates the that other tool is de-activated. This is illustrated in the table below.

| tiles_group_header( ) { | Descriptor |
|---|---|
| . . . | |
| if ( hl_dependent_quant_enable_flag ) { | |
|   ll_dependent_quant_enable_flag | u(1) |
| } | |
| if ( hl_sign_data_hiding_flag && | |
| !ll_dependent_quant_enable_flag ) { | |
|   ll_sign_data_hiding_enable_flag | u(1) |
| } | |
| . . . | |

Figure 13:
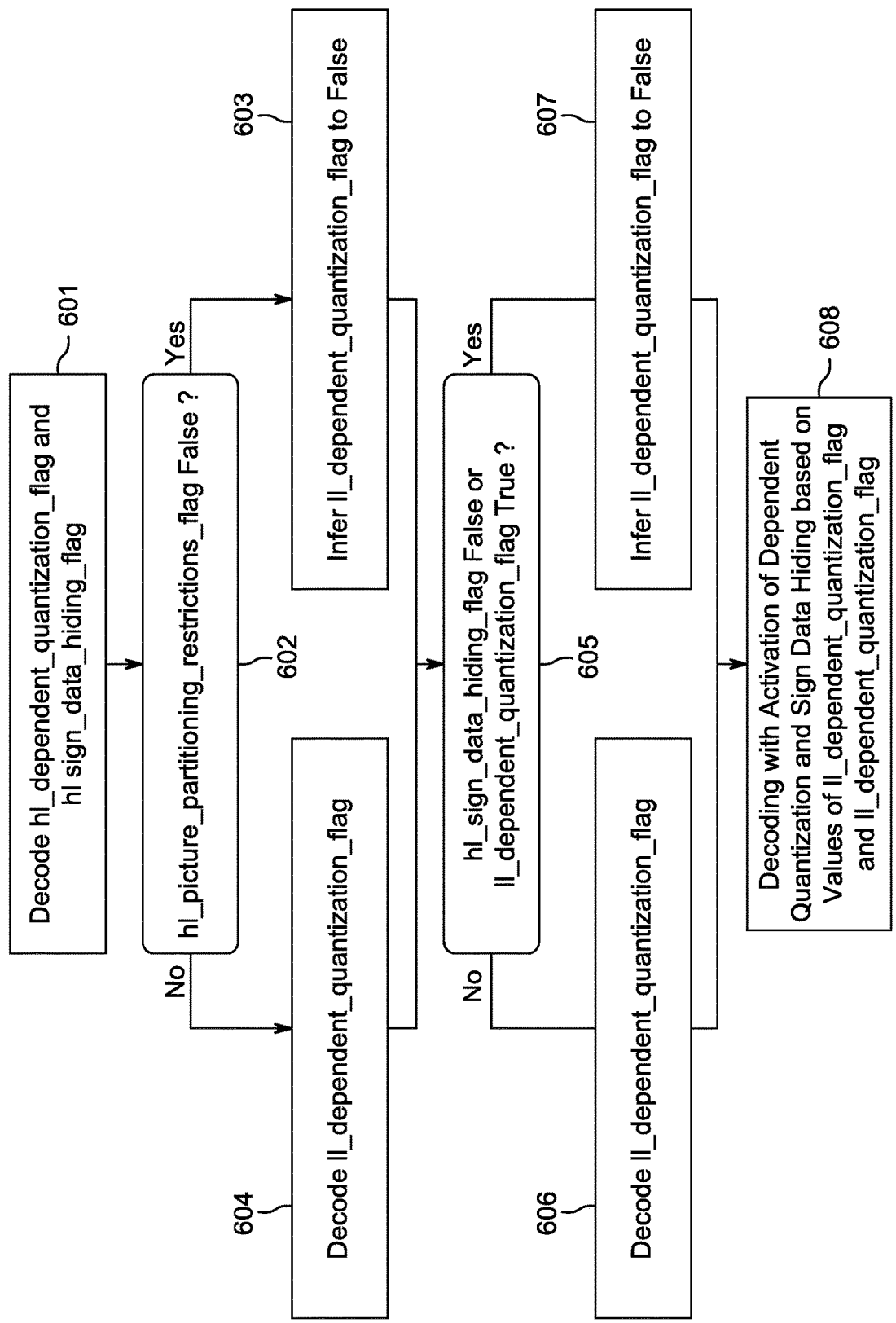
FIG. 13 shows an example decoding process for dependent quantization and sign data hiding enabling flags signaling.

The corresponding semantics are one example.

hl_dependent_quant_enable_flag equal to 1 specifies that the syntax element ll_dependent_quant_enable_flag is present in tiles group header of pictures in the CVS. hl_dependent_quant_enable_flag equal to 0 specifies that the syntax element ll_dependent_quant_enable_flag is not present in tiles group header of pictures in the CVS.
A similar semantic is used for hl_sign_data_hiding_flag.
ll_dependent_quant_enable_flag equal to 1 specifies that the dependent quantization mode is enabled. ll_dependent_quant_enable_flag equal to 0 specifies that the dependent quantization mode is disabled. When ll_dependent_quant_enable_flag is not present, it is set equal to 0.
ll_sign_data_hiding_enable_flag equal to 1 specifies that the sign data hiding mode is enabled. ll_sign_data_hiding_enable_flag equal to 0 specifies that the sign data hiding mode is disabled. When ll_sign_data_hiding_enable_flag is not present, it is set equal to 0.
A simplified block diagram of the decoding process is depicted in FIG. 13.

Embodiment 11—Mutual Control of Separate Luma/Chroma Tree and Cross-Component Linear Model/Multi-Directional LM Tools (Case3)

In an embodiment, the high-level syntax control for C_CST, A_CCLM and A_DMLM is such that C_CST activation requires deactivation of A_CCLM and A_DMLM, and inversely, C_CST deactivation requires activation of A_CCLM and A_DMLM.
A design similar to the one described in previous sub-section above can be used.
The detailed syntax & semantics can be done as above.
Summary of the Tools Categorization
This section summarizes the tools classification among the 3 considered cases.
  Case1
    C_TT64, C_QT128, C_BT could be grouped into one single flag related to split constraints for making split VPDU-friendly
    C_PR and C_FBP could be grouped as tools related to partitioning control
    R_GBI, R_TRI, R_MH could be grouped as tools based on the same concept of multi-hypothesis with weighting samples coming from 2 predictions, logically should be activated/deactivated together; R_OBMC could also be seen as conceptually in same set as multi-hypothesis with weighting samples
  Case2
    A_CCLM deactivated implies A_MDLM deactivated
    R_TMVP deactivated implies R_ATMVP deactivated
    T_MTS_intra deactivated implies T_MTS_inter deactivated
    T_RTT performance is potentially dependent on T_MTS, thus T_MTS deactivated implies T_RTT deactivated
    R_HPMV disabled will possibly impact the coding efficiency of R_AFF, R_MMVD, R_DMVR, R_PAMC, thus its deactivation implies some or all of the following tools, R_AFF, R_MMVD, R_DMVR, R_PAMC, are deactivated as well
    C_CST could have strong impact on A_PM for screen content as palette mode benefits a lot of usage of separate luma/chroma tree, thus its deactivation implies A_PM is deactivated as well
    C_CST deactivated implies A_CPR deactivated
  Case3
    Q_DQ should be deactivated when C_SDH is activated and vice-versa
    C_CST should be deactivated when A_CCLM and A_MDLM is activated and vice-versa The described aspects and embodiments can provide coding gain, that is, increased quality for a same bitrate, or decreased bitrate for a same quality. Also, it can deeply ease the implementation of the codec, by limiting the possibilities of tools combinations. This is an essential point for interoperability.

Another aspect of the tool combination is related to the syntax for multiple components video. One issue arising with the new tools in VVC is that some of these tools may interact with a negative impact on performance or may simply not be appropriately designed for working together when applied to individual components of a multi-components picture. A typical example is the way the chroma separate tree is handled. In a typical approach, the pictures to be coded may comprise a luma component (e.g. Y') and 2 chroma components (typically Cb, Cr) or 3 components (e.g. R, G, B). In case of separate CU-tree, the luma component and the 2 chroma components are coded independently. When dealing with such separately coded multiple components, the possible relationship between components is not defined.

TABLE 3

Example of multiple components syntax
(new elements in italics)

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |
| number_of_components_minus1 | ue(v) |
| if(number_of_components_minus1 != 0 ) | |
|   separate_components_plane_flag | u(1) |
| pic_width_in_cmp_samples[0] | ue(v) |
| pic_height_in_cmp_samples[0] | ue(v) |
| bit_depth_cmp_minus8[0] | ue(v) |
| type_cmp[0] | ue(v) |
| conformance_window_flag | u(1) |
| if( conformance_window_flag ) { | |
|   conf_win_left_offset | ue(v) |
|   conf_win_right_offset | ue(v) |
|   conf_win_top_offset | ue(v) |
|   conf_win_bottom_offset | ue(v) |
| } | |
| for( i = 1; i <= number_of_components_minus1; i++ ) { | |
|   pic_width_in_cmp_samples[i] | ue(v) |
|   pic_height_in_cmp_samples[i] | ue(v) |
|   bit_depth_cmp_minus8[i] | ue(v) |
|   type_cmp[i] | ue(v) |
| } | |
| log2_max_pic_order_cnt_lsb_minus4 | ue(v) |
| . . . | |

An advantage of coding independent (separate) components in the same bitstream is that the GOP structure of all components is the same: the reference frames, IDR frame etc. are the same. Another advantage is parallelization (component-level encoding and decoding pipe).

The general aspects next described aim at setting the tools interaction between components for multi-channels format.

The syntax and behavior between coded components need to be created for the candidate tools proposed in VVC which are introducing dependency between components.

The problem is yet to be addressed in JVET if multi-channels formats are adopted. Note that even without using multi-channels format, the same issues need to be addressed for RGB format or other image formats (image+depth or auxiliary picture . . . ).

The general aspects described next propose to provide a process specifying tools interaction between channels. This may be performed thanks to the insertion of syntax changes and/or semantics changes. The invention describes several variants according to relationships between components.

List of Considered Tools

Table 2 gives a list of tools included in VTM3 plus some additional tools being explored and that could be added later on in the VTM. They are classified by category.

TABLE 2 list of tools considered in VTM3 and for further VTM.

| | Description |
|---|---|
| Coding structure | |
| C_PR | Partition restriction avoiding redundant splits |
| C_FBP | Frame boundary partitioning |
| C_TT64 | Split restriction TT when size >64 |
| C_QT128 | Implicit split QT 128 × 128 to 64 × 64 in I slice |
| C_BT | Split constraint (L0081) on horiz BT for 64 × 128 |
| C_CST | Chroma separate tree |
| Intra prediction | |
| A_67IPM | 67 intra pred mode |
| A_WIP | Wide angle intra prediction |
| A_6MPM | MPMs moved to 6 instead of 3 for HEVC |
| A_CCLM | Cross-component linear model |
| A_MDLM | Multi-directional LM |
| A_MRLP | Multi-ref line prediction |
| A_PDPC | Position dependent prediction combination |
| A_IRIP | Intra reference sample interpolation filter |
| A_CPR | Current picture referencing (intra block copy) |
| A_PM | Palette mode |
| R_HPMV | MVs defined with a precision of 1/16 |
| R_AMVR | Adaptive motion vector resolution |
| R_TMVP | Temporal MV Prediction |
| R_ATMVP | Alternative temporal motion vector prediction |
| R_HMVP | History based motion vectors list |
| R_MMVD | Merge with MVD aka Ultimate MV expression |
| R_PAMC | Pairwise average merging candidates |
| R_AFF | Affine motion model |
| R_GBI | Generalized bi-pred |
| R_TRI | Triangular partitions |
| R_MH | Multi-hypothesis Combined merge/intra |
| R_OBMC | Overlapped block motion compensation |
| R_BIO | Bi-directional optical flow |
| R_PERP | PERP with horiz geometry padding of ref picts |
| R_DMVR | Decoder side motion vector refinement |
| R_WP | Weighted pred |
| R_LIC | Local illumination compensation |

TABLE 2-continued list of tools considered in VTM3 and for further VTM.

| | Description |
|---|---|
| Loop filtering | |
| L_DBF | Deblocking filter applying as 1st in-loop filter |
| L_SAO | Sample adaptive offset |
| L_ALF | Adaptive loop filter |
| Transform | |
| T_MTS_intra | Adaptive multi-core transform for intra CUs |
| T_MTS_inter | Adaptive multi-core transform for inter CUs |
| T_ST | Secondary transforms |
| T_RTT | Recursive transform tree |
| Quantizton | |
| Q_DQ | Dependent quantization |
| Coefs coding | |
| C_SDH | Sign data hiding |

Several SPSs can be signaled in the bitstream. They may include flags to control the tools at the sequence level.

Besides the SPSs, additional parameter sets, of lower level in the syntax (such as PPS, slice header, tiles group header, tiles header) can be specified. They may include additional flags to control the tools at the lower level than the sequence level.

Some terms and notions helpful for the understanding of the invention are:
component: same definition as defined in H.26x standards (e.g. in clause 3.37 of HEVC, February 2018 version)
primary component: component to which a secondary component depends on. Typically, a primary component does not depend on any other components during decoding process.
NOTE 1: Primary component might have a dependency with respect to entropy coding (e.g. CABAC)
NOTE 2: Typically, a primary component is the luma component of a video signal comprising luma and 2 chroma channels
secondary component: component which depends on a primary component during the decoding process.
NOTE 3: Typically, secondary components are chroma channels of a luma and 2 chroma channels video signal.
(non-)separate components: components with a (non-)dependency during the decoding process.
components set: a group of non-separate components.
NOTE 4: a component set typically comprises non-separate primary and secondary components
NOTE 5: an example of two components sets would be a first component set which comprises Y' (primary component), Cb (secondary component), Cr (secondary component) components and a second component set which comprises a mask (primary component) and a depth (secondary component) channels
NOTE 6: components may be referred as "color planes"

Embodiment 12: Signaling and Logic in Case of Separate Components

In one embodiment, the components are signaled as separate components or non-separate components. A method to describe the status of the activated tools associated to the coding of separate or non-separate components is applied thanks to the parsing of the structure sps_active_tools_set.

One advantage of the described method is that some coding tools might be deactivated when they are known to be inefficient for a given component type (e.g. this may be constrained in a profile). An example of syntax is provided in the following table, where syntax changes are in italics.

|  | Descriptor |
|---|---|
| seq_parameter_set rbsp( ) { |  |
|   sps_video_parameter_set_id | u(4) |
|   *sps_active_tools_set( )* |  |
|   sps_max_sub_layers_minus1 | u(3) |
|   sps_temporal_id_nesting_flag | u(1) |
|   profile_tier_level( 1, sps_max_sub_layers_minus ) |  |
|   sps_seq_parameter_set_id | ue(v) |
|   number_of_component_minus1 | ue(v) |
|   pic_width_in_cmp_samples[0] | ue(v) |
|   pic_height_in_cmp_samples[0] | ue(v) |
|   bit_depth_cmp_minus8[0] | ue(v) |
|   type_cmp[0] | ue(v) |
|   conformance_window_flag | u(1) |
|   if( conformance_window_flag ) { |  |
|     conf_win_left_offset | ue(v) |
|     conf_win_right_offset | ue(v) |
|     conf_win_top_offset | ue(v) |
|     conf_win_bottom_offset | ue(v) |
|   } |  |
|   for( i = 1; i <= number_of_components_minus1; i++ ) { |  |
|     pic_width_in_cmp_samples[i] | ue(v) |
|     pic_height_in_cmp_samples[i] | ue(v) |
|     bit_depth_cmp_minus8[i] | ue(v) |
|     type_cmp[i] | ue(v) |
|     *separate_cmp_flag[i]* | *u(1)* |
|     *if (separate_cmp_flag[i]) {* |  |
|       *sps_active_tools_set( )* |  |
|     *}* |  |
|   } |  |
|   log2_max_pic_order_cnt_lsb_minus4 | ue(v) |
|   ... |  |

By design, if a non-primary component is not marked as separate, it is a secondary component (e.g. Y). The set of tools activated for primary and secondary components are indicated in the first occurrence of sps_active_tools_set( ) as described above. A typical example would be a "Y'CbCr+depth" video signal where the Y', Cb and Cr components are non-separate components, but the depth component is a separate component.

Figure 18:
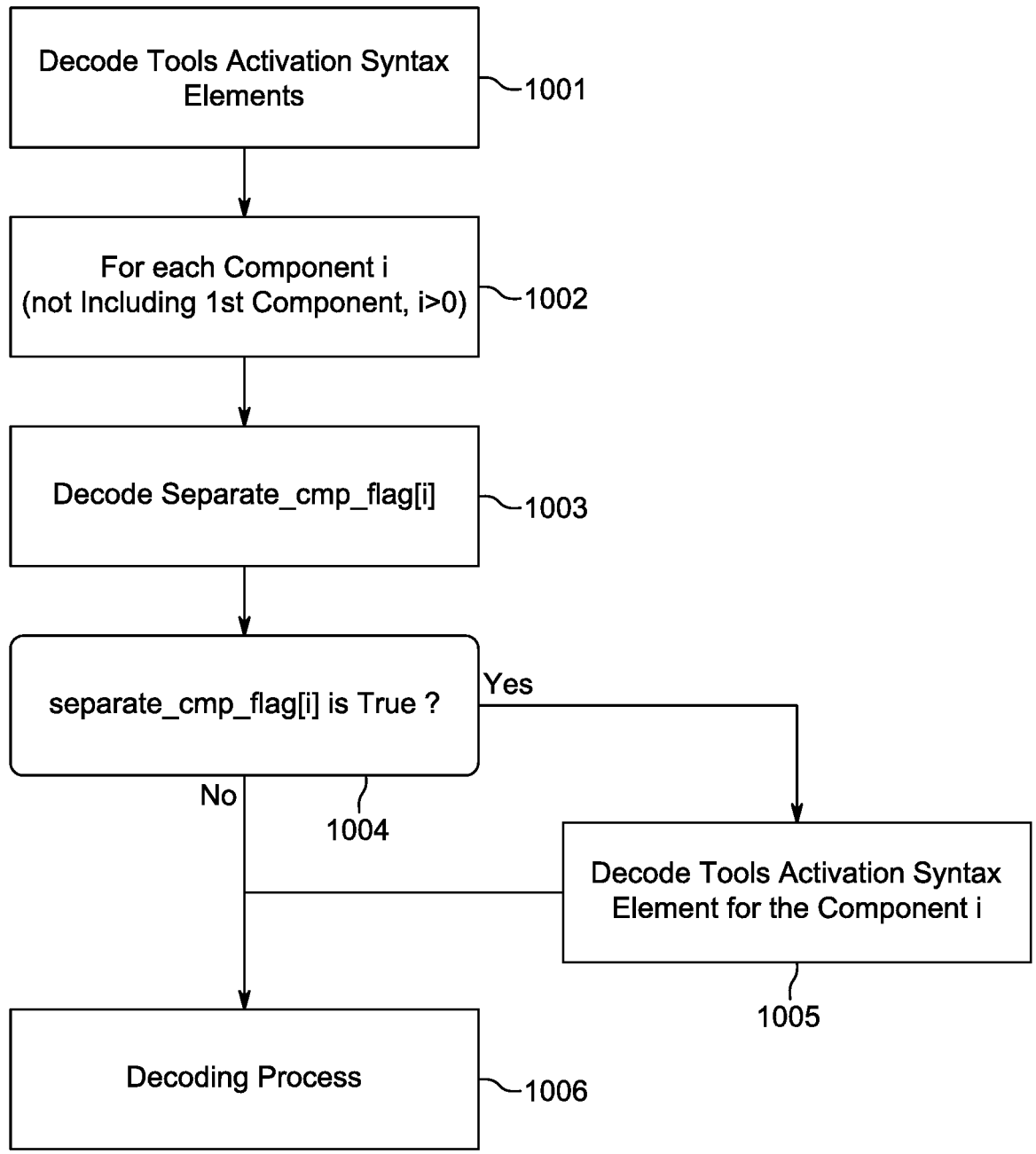
FIG. 18 shows a simplified block diagram of the decoding process according to the $1^{st}$ embodiment.

A simplified block diagram of the decoding process according to the embodiment is depicted in FIG. 18. In step 1001, the syntax elements related to the tools activations are decoded. They apply at least to the primary component. In step 1002, a loop over the remaining components (index by i, larger than 1, i=0 corresponding to the primary component) is performed. In step 1003, a flag separate_cmp_flag[i] is decoded. The value of the flag is checked in step 1004. If the flag is equal to true, step 1005 is applied. Step 1005 performs the decoding of the syntax elements related to the tools activations for the component i. If the flag is equal to false, the syntax elements related to the tools activations decoded in step 1001 apply for the component i. Final step 1006 corresponding to the decoding process with the activation or de-activation of tools based on the decoded syntax elements, and possibly additional low-level syntax elements controlling the tools at a lower level than the sequence level.

Example of sps_active_tools_set( )

A typical example of sps_active_tools_set( ) is defined as below:

| sps_active_tools_set( ) { | Descriptor |
|---|---|
|   intra_only_constraint_flag | u(1) |
|   max_bitdepth_constraint_idc | u(4) |
|   frame_only_constraint_flag | u(1) |
|   no_adaptive_loop_filter_constraint_flag | u(1) |
|   no_sample_adaptive_offest_constraint_flag | u(1) |
|   no_dep_quant_constraint_flag | u(1) |
|   no_sign_data_hiding_constraint_flag | u(1) |
|   no_extra_intra_modes_constraint_flag | u(1) |
|   no_wide_intra_angles_constraint_flag | u(1) |
|   no_multi_trans_constraint_flag | u(1) |
|   no_affine_motion_constraint_flag | u(1) |
|   no_high_precision_mvs_constraint_flag | u(1) |
|   no_temporal_mvp_constraint_flag | u(1) |
|   no_sbtmvp_constraint_flag | u(1) |
|   no_adaptive_mv_res_constraint_flag | u(1) |
|   ... |  |

It is noted that the syntax elements depicted in the table above may be indexed by a component index.

There are specific tools that involve inter-component dependencies, which means that the decoding process of at least one component involves accessing the samples from the other component. One example is the Cross-component linear model (CCLM) tool, used to predict the chroma samples from the luma samples.

Embodiment 13: Signaling and Logic in Case of Related Components

When some components are non-separate, their corresponding high-level syntax elements (e.g. present in SPS, PPS . . . ) for controlling the tools activation/de-activation may be grouped in one set only.

Primary and secondary components have a dependence relationship during the decoding process; for instance:
- for inter slice or inter CTU: all components are considered as non-separate (for example motion compensation is signaled and done during the same stage for all components).
- for intra slice: components are considered non-separate when C_CST (Chroma Separate Tree), or any other inter-component tool, is disabled or separate when C_CST, or any other inter-component tool, is enabled (with still some relationship from the Y component to the UV components. This especially applies for tools using a prediction of chroma data coming from the co-located luma data.

In order to describe these relationships, the following syntax is proposed:

|  | Descriptor |
|---|---|
| seq_parameter_set_rbsp( ) { |  |
|   ... |  |
|   sps_active_tools_set( ) |  |
|   number_of_components_minus1 | ue(v) |
|   if( number_of_components_minus1 != 0 ) { |  |
|     *number_of_components_group_minus1[0]* | *ue(v)* |
|     *if* |  |
| *( number_of_components_group_minus1[0] > 0 )* |  |
|       *decode_inter_cxomponents_tools_flags( )* |  |
|   } |  |

-continued

| | Descriptor |
|---|---|
| type_cmp[0] | ue(v) |
| conformance_window_flag | u(1) |
| if( conformance_window_flag ) { | |
|   conf_win_left_offset | ue(v) |
|   conf_win_right_offset | ue(v) |
|   conf_win_top_offset | ue(v) |
|   conf_win_bottom_offset | ue(v) |
| } | |
| for( i = 1; i <= number_of_components_minus1; i++ ) { | |
|   pic_width_in_cmp_samples[i] | ue(v) |
|   pic_height_in_cmp_samples[i] | ue(v) |
|   bit_depth_cmp_minus8[i] | ue(v) |
|   type_cmp[i] | ue(v) |
|   primary_cmp_id_plus1[i] | ue(v) |
|   if ( primary_cmp_id_plus1[i] == 0 ) { | |
|     sps_active_tools_set( ) | |
|   number_of_components_group_minus1[ i ] | ue(v) |
|   if | |
|   ( number_of_components_group_minus1[ i ] > 0 ) | |
|   decode_inter_components_tools_flags() | |
|   } | |
| } | |
| log2_max_pic_order_cnt_lsb_minus4 | ue(v) |
| ... | |

When the value primary_cmp_id_plus1 [i] equals 0, the component of index i is considered as the primary component. By default, the first component (index 0) is the primary component. If the value is not 0, then it indicates the primary component used by this secondary component. The syntax elements signaling the activation status of coding tools for a component are stored in sps_active_tools_set( ) Tools related to relationship between components are parsed, if needed, using decode_inter_components_tools_flags(i).

A typical example is the format YUV where Y is the primary component and UV secondary components.

number_of_components_group_minus[i] specifies the number of components inside a component set which the primary component i belongs to. If the group of related components has more than one component, the inter-components tools related flags are decoded.

For example, in case of 4:2:0 (non-separate) YUV format, the following values are obtained for the considered syntax elements:

| syntax element | value |
|---|---|
| ... | |
| number_of_components_minus1 | 2 |
| ... | 0 |
| pic_width_in_cmp_samples[0] | width |
| pic_height_in_cmp_samples[0] | height |
| bit_depth_cmp_minus8[0] | 0 |
| number_of_components_group_minus[0] | 2 |
| decode_inter_components_tools_flags( ) | |
| pic_width_in_cmp_samples[1] | width/2 |
| pic_height_in_cmp_samples[1] | height/2 |
| bit_depth_cmp_minus8[1] | 0 |
| primary_cmp_id[1] | 0 |
| pic_width_in_cmp_samples[2] | width/2 |
| pic_height_in_cmp_samples[2] | height/2 |
| bit_depth_cmp_minus8[2] | 0 |
| primary_cmp_id[2] | 0 |

Another example of values for a multi-channel bitstream containing a YUV+Depth is given by:

| syntax element | value |
|---|---|
| ... | |
| number_of_components_minus1 | 3 |
| ... | 0 |
| pic_width_in_cmp_samples[0] | width |
| pic_height_in_cmp_samples[0] | height |
| bit_depth_cmp_minus8[0] | 0 |
| number_of_components_group_minus[0] | 2 |
| decode_inter_components_tools_flags( ) | |
| pic_width_in_cmp_samples[1] | width/2 |
| pic_height_in_cmp_samples[1] | height/2 |
| bit_depth_cmp_minus8[1] | 0 |
| primary_cmp_id[1] | 0 |
| pic_width_in_cmp_samples[2] | width/2 |
| pic_height_in_cmp_samples[2] | height/2 |
| bit_depth_cmp_minus8[2] | 0 |
| primary_cmp_id [2] | 0 |
| pic_width_in_cmp_samples[3] | width |
| pic_height_in_cmp_samples[3] | height |
| bit_depth_cmp_minus8[3] | 0 |
| primary_cmp_id[3] | −1 |

An example of decode_inter_components_tools_flags syntax is given in the following table:

| decode_inter_components_tools_flags( ) { | Descriptor |
|---|---|
|   chroma_separate_tree | u(1) |
|   cpr_direct_mode_enable | u(1) |
|   intra_direct_mode | u(1) |
|   lm_chroma_mode | u(1) |
|   ... | |

The flags in decode_inter_components_tools_flags enable or disable modes which make use of data from the primary components.

For example, lm_chroma_mode allows predicting a component from the primary component using CCLM tool. The flag separate_chroma_tree allows to have a separate tree in intra slice for coding the current component. When the flag separate_chroma_tree is true, it is assumed that all components other than the main component are grouped together (i.e. share the same tree). For others, the secondary components use the same signalling as the primary component.

Additional Secondary Component Syntax

TABLE 4

Additional secondary component syntax

| decode_inter_components_tools_flags( ) { | Descriptor |
|---|---|
|   ... | |
|   CABAC_dependency | u(1) |
|   chroma_separate_tree_inter | u(1) |
|   if (chroma_separate_tree_inter) inter_direct_mode | u(1) |
|   reduced_tools_set_chroma | u(1) |
|   ... | |

In a variant, the syntax described in Table 4, is added to the syntax.

The first flag CABAC_dependency signal if the primary and secondary components share some dependencies during the CABAC entropy decoding process. If not, it means the whole primary component can be parsed independently from the secondary component.

The flag chroma_separate_tree_inter signaled if the inter slice/CTU used a separate tree similarly to the chroma_separate_tree currently used for intra slice/CTU. If this flag is true, an additional flag inter_direct_mode indicates if a secondary component can derive some inter data from the primary component (typically the collocated motion information).

The flag reduced_tools_set_chroma indicated if the secondary component use a reduced set of tools or not. The reduced set of tools are, for example, in the current version:
A smaller number of intra direction
A smaller number of possible transform type (MTS)
Etc.

Embodiment 14: Finer Control of Secondary Components Tools

Inside a component set, the relationship between components and tools status might need to be more accurately described and/or might be component-dependent. In this case, an additional flag separate_tools_flag assigned for each secondary component is read. This flag indicates if specific tools control syntax elements are inserted for this secondary component. If the flag is true, then the tools enable/disable flags are parsed for this secondary component (using a call to decode_tools_flags( )). Associated syntax is given below:

| | Descriptor |
|---|---|
| seq_parameter_set_rbsp( ) { | |
| ... | |
| decode_tools_flags( ) | |
| number_of_components_minus1 | ue(v) |
| if(number_of_components minus1 != 0 ) { | |
|    number_of_components_group_minus[0] | *ue(v)* |
|    *if* | |
| (number_of_components_group_minus1[0]>0) | |
|    decode_inter_components_tools_flags(0) | |
| } | |
| type_cmp[0] | ue(v) |
| conformance_window_flag | u(1) |
| if( conformance_window_flag ) { | |
|    conf_win_left_offset | ue(v) |
|    conf_win_right_offset | ue(v) |
|    conf_win_top_offset | ue(v) |
|    conf_win_bottom_offset | ue(v) |
| } | |
| for( i = 1; i <= number_of_components_minus1; i++ ) { | |
|    pic_width_in_cmp_samples[i] | ue(v) |
|    pic_height_in_cmp_samples[i] | ue(v) |
|    bit_depth_cmp_minus8[i] | ue(v) |
|    type_cmp[i] | ue(v) |
|    primary_cmp_id_plus1 [i] | *ue(v)* |
|    *if (primary_cmp_id_plus1[i] == 0) {* | |
|      decode_tools_flags( ) | |
|      number_of_components_group_minus[i] | |
|      if | |
| (number_of_components_group_minus1[i]>0) | |
|      decode_inter_components_tools_flags( ) | |
|    } *else {* | |
|      separate_tools_ flag[i] | *u(1)* |
|      *if (separate_tools_flags[i])* | |
|        decode_tools_flags( ) | |
|    } | |
| } | |
| log2_max_pic_order_cnt_lsb_minus4 | ue(v) |
| ... | |

In this case, the secondary components are grouped together and share the same flags of inter-components tools.

Secondary Components Relationship

A more general approach is to completely describe the inter-components relationship of tools. The advantage is to allow having groups of non-separate components where both the regular (non-inter-components) tools and the inter-components tools status (activation/de-activation) are customized per component.

An example of associated syntax is given below:

| | Descriptor |
|---|---|
| seq_parameter_set_rbsp( ) { | |
| ... | |
| number_of_components_minus1 | ue(v) |
| type_cmp[0] | ue(v) |
| conformance_window_flag | u(1) |
| if( conformance_window_flag ) { | |
|    conf_win_left_offset | ue(v) |
|    conf_win_right_offset | ue(v) |
|    conf_win_top_offset | ue(v) |
|    conf_win_bottom_offset | ue(v) |
| } | |
| for( i = 0; i <= number_of_components_minus1; i++ ) { | |
|    pic_width_in_cmp_samples[i] | ue(v) |
|    pic_height_in_cmp_samples[i] | ue(v) |
|    bit_depth_cmp_minus8[i] | ue(v) |
|    type_cmp[i] | ue(v) |
|    if ( i != 0)] | |
|      primary_cmp_id_plus1 [i] | *ue(v)* |
|    *if ( i == 0 || primary_cmp_id_plus1 [i] == 0) {* | |
|      decode_tools_flags( ) | |
|    } *else {* | |
|      separate_tools_ flag[i] | *u(1)* |
|      *if (separate_tools_flag[i]) {* | |
|      decode_inter_components_tools_flags_2( ) | |
|        custom_decode_flag | *u(1)* |
|        *if (custom_decode_flag)* | |
|          decode_tools_flags( ) | |
|      } | |
|    } | |
| } | |
| log2_max_pic_order_cnt_lsb_minus4 | ue(v) |
| ... | |

In this variant, the decoding of the component 0 parameters has been put inside the loop on the components for sake of simplicity.

For a given component, when separate_tools_flag is true, inter-component tool syntax elements specific to a component are decoded (call of decode_inter_components_tools_flags_2(i)). Additionally, it is possible to have specific syntax elements controlling the non-inter-components tools for this component, when the flag custom_decode_flag is true.

The decode_inter_components_tools_flags_2 flags performs as follow:

| decode_inter_components_tools_flags_2( ) { | Descriptor |
|---|---|
|    chroma_separate_tree | u(1) |
|    cpr_direct_mode_enable | u(1) |
|    intra_direct_mode | u(1) |
|    Im_chroma_mode | u(1) |
| ... | |
|    if ( !chroma_separate_tree|| cpr_direct_mode_enable|| | |
|      intra_direct_mode||Im_chroma_mode ) | |
|      component_to_inherit_from | ue(v) |

For separate components, if an inter-tools component is activated, then the component to inherit from is read in the bitstream (syntax element component_to_inherit_from). The inheriting of a component means:

If chroma_separate_tree is false then the tree of the component is shared with the component specified by component_to_inherit_from For other tools (CPR, LM etc.), if the flag associated to the mode is true, then the data (motion vector preditors, pixels samples etc.) are inherited from the component specified by component_to_inherit_from When separate_tools_flag is false, the inter-components tools are set the true, except separate chroma_separate_tree set to false.

An additional flag for customizing non-inter-components tools is read in order to decide if the component can customize each tool individually. If the flag is false, the flag of the main component associated are used.

The invention can provide coding gain, that is, increased quality for a same bitrate, or decreased bitrate for a same quality as it allows to describe accurately the relationship between components of the same temporal data.

Figure 19:
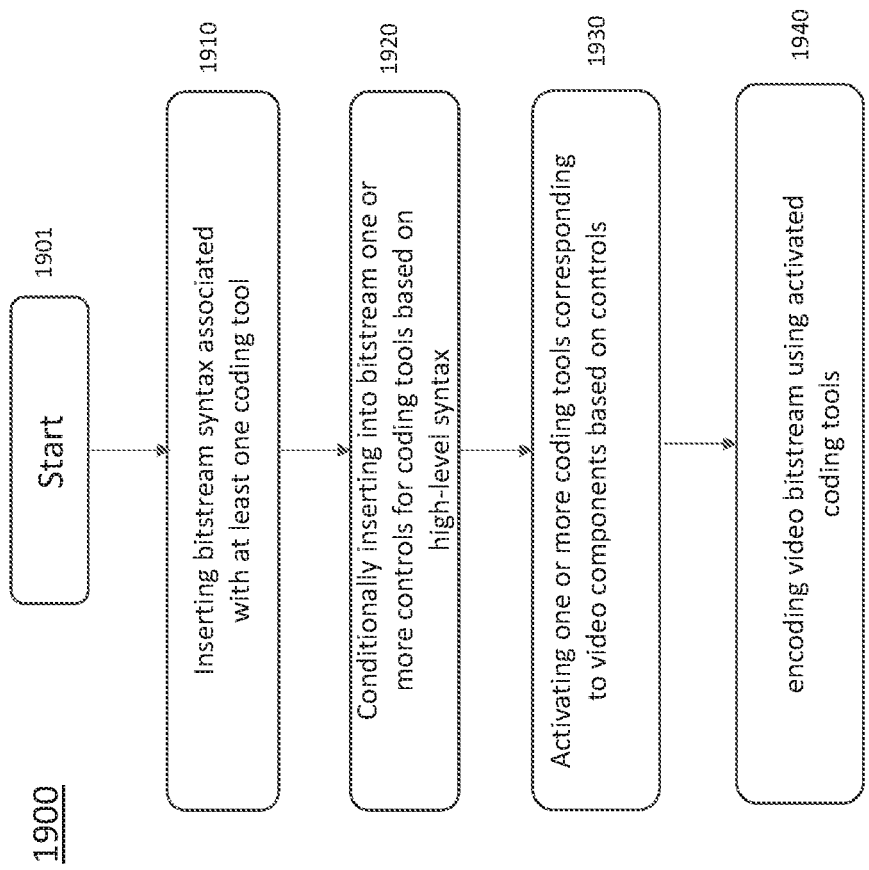
FIG. 19 shows one embodiment of a method under the general described aspects.

One embodiment of a method 1900 under the general aspects described here is shown in FIG. 19. The method commences at start block 1901 and control proceeds to block 1910 for inserting syntax associated with at least one coding tool into a video bitstream. Control proceeds from block 1910 to block 1920 for conditionally inserting into the bitstream one or more controls for coding tools based on high-level syntax inserted in the bitstream. Control proceeds from block 1920 to block 1930 for activating one or more coding tools corresponding to video components based on the one or more controls. Control proceeds from block 1930 to block 1940 for encoding the video bitstream using the activated coding tools.

Figure 20:
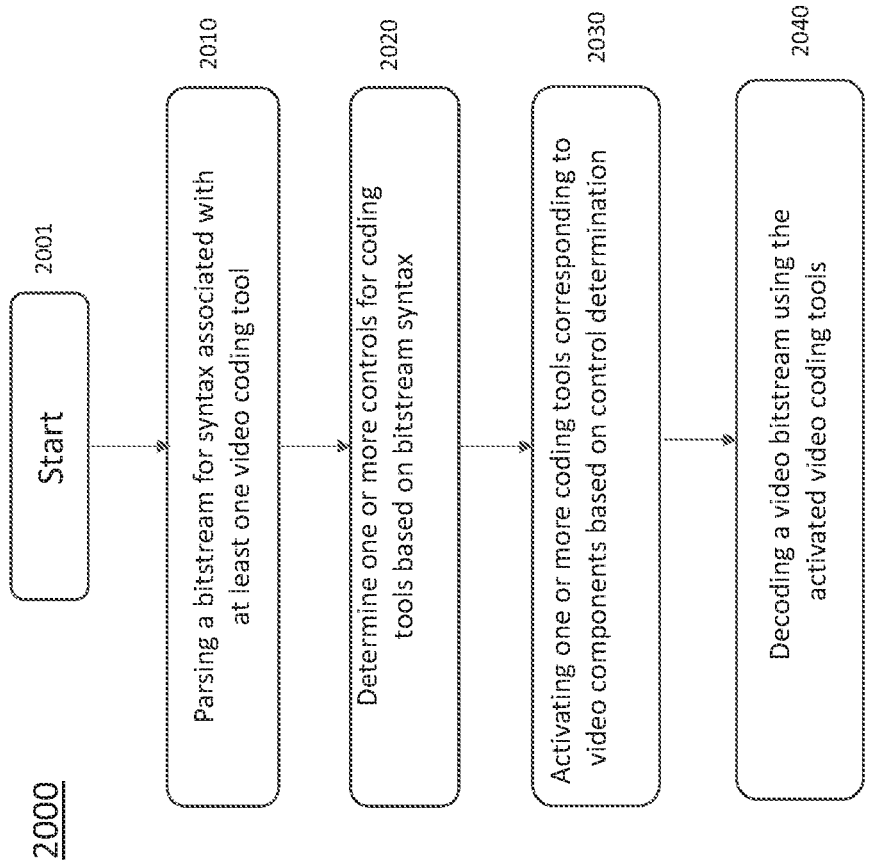
FIG. 20 shows another embodiment of a method under the general described aspects.

One embodiment of a method 2000 under the general aspects described here is shown in FIG. 20. The method commences at start block 2001 and control proceeds to block 2010 for parsing a video bitstream for syntax associated with at least one video coding tool. Control proceeds from block 2010 to block 2020 for determining one or more controls for coding tools based on the video bitstream syntax. Control proceeds from block 2020 to block 2030 for activating one or more coding tools corresponding to video components based on the determination of controls. Control proceeds from block 2030 to block 2040 for decoding the video bitstream using the activated coding tools.

Figure 21:
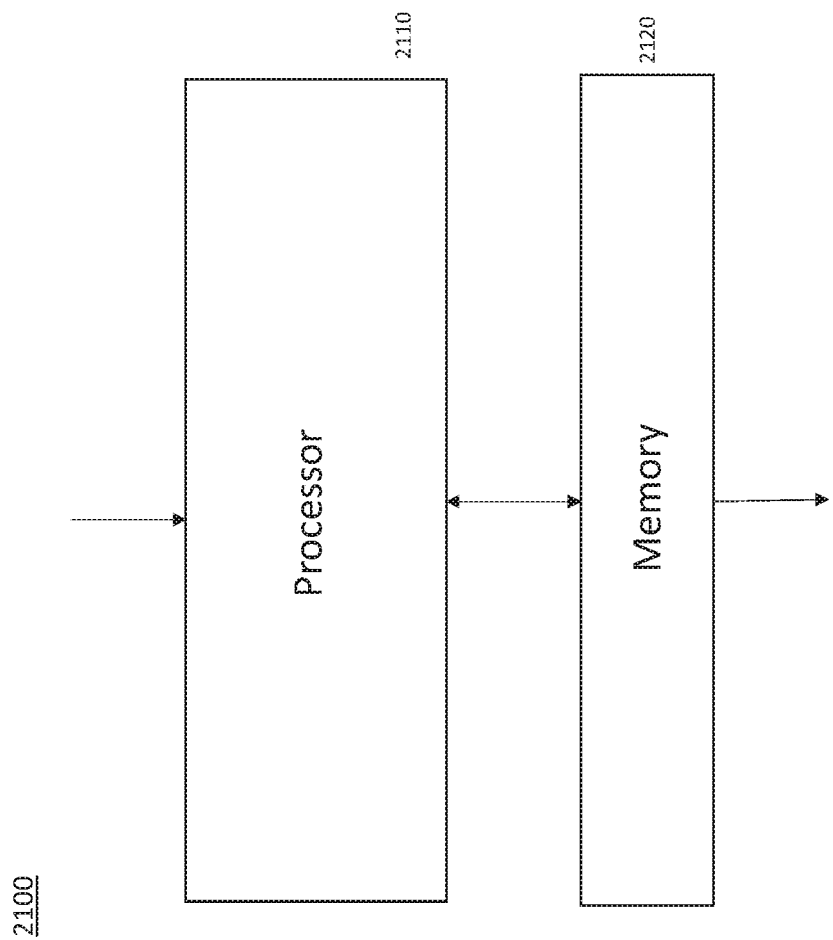
FIG. 21 shows an example apparatus under the described aspects.

FIG. 21 shows one embodiment of an apparatus 2100 for encoding, decoding, compressing or decompressing video data using simplifications of coding modes based on neighboring samples dependent parametric models. The apparatus comprises Processor 2110 and can be interconnected to a memory 2120 through at least one port. Both Processor 2110 and memory 2120 can also have one or more additional interconnections to external connections.

Processor 2110 is also configured to either insert or receive information in a bitstream and, either compressing, encoding or decoding using any of the described aspects.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 2:
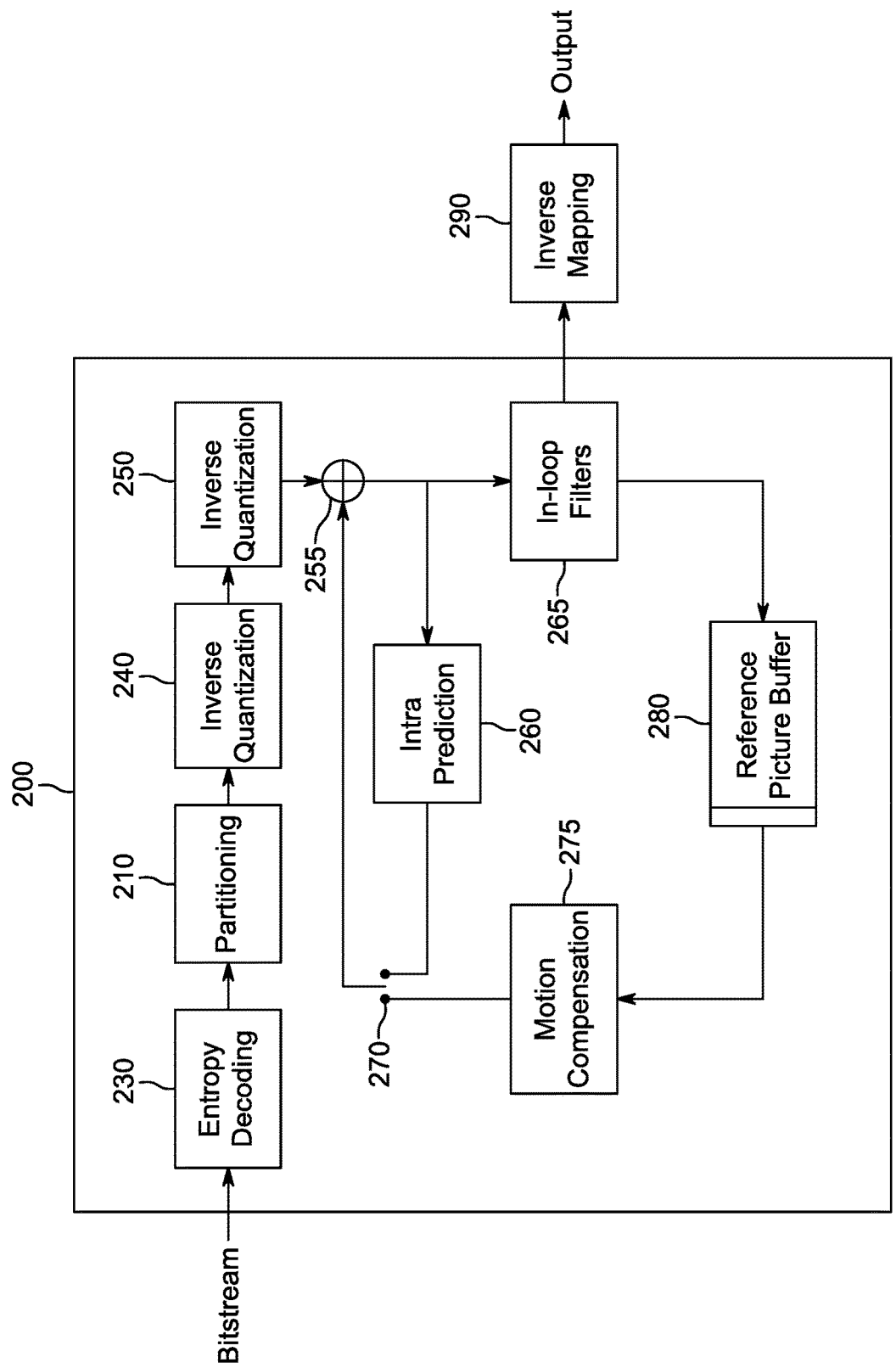
FIG. 2 shows a standard, generic video decompression scheme.
Figure 17:
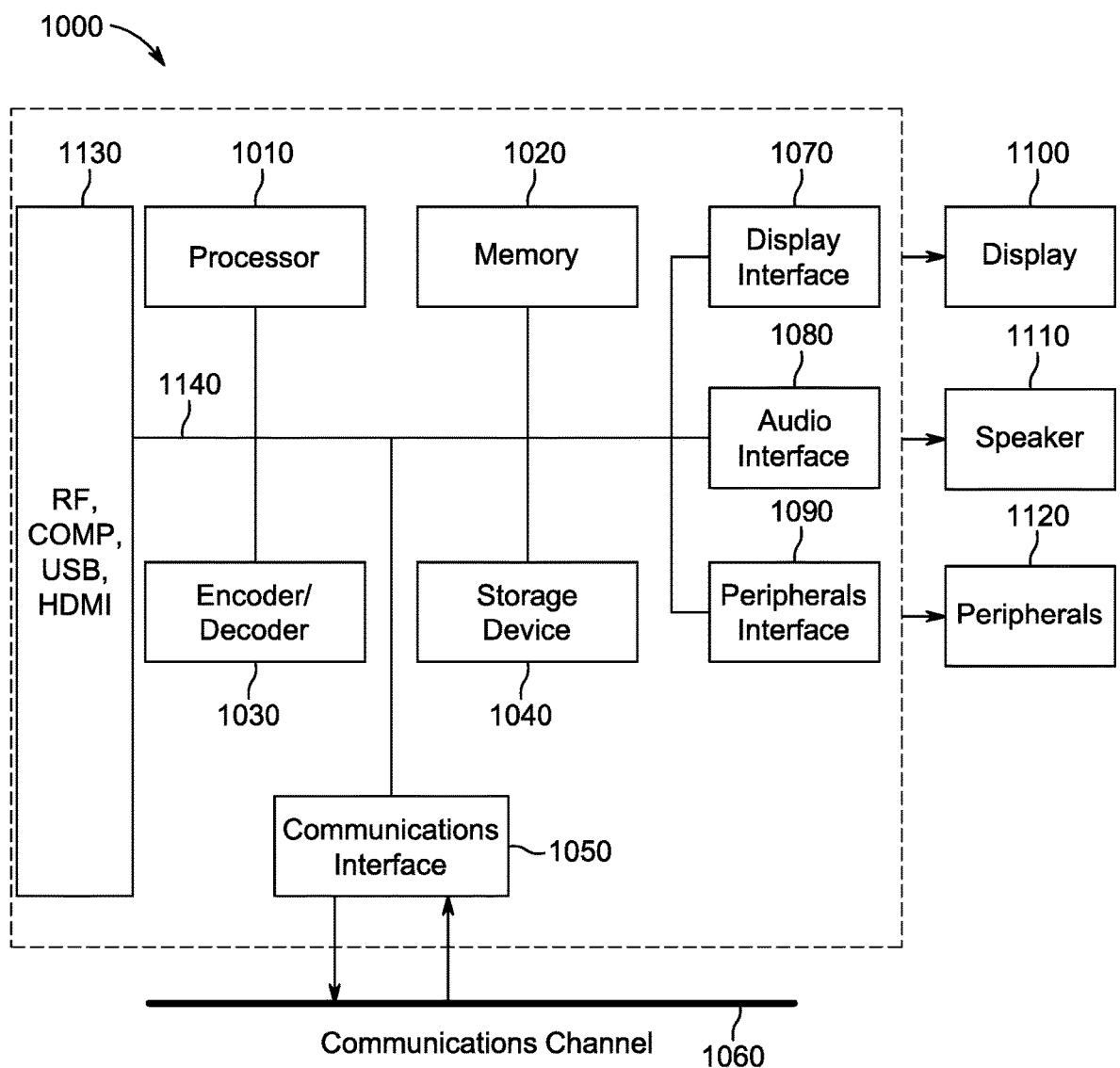
FIG. 17 shows a processor based system for encoding/decoding under the general described aspects.

The aspects described and contemplated in this application can be implemented in many different forms. FIGS. 1, 2 and 17 provide some embodiments, but other embodiments are contemplated and the discussion of FIGS. 1, 2 and 17 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 17 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 17, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

- A process or device to restrict tool activation or deactivation in an encoder or a decoder.
- A process or device to operate restrictions in high-level syntax or semantics in an encoder or decoder that constrains a possible set of tool combinations.
- A process or device comprising syntax or semantics that specify tools combinations limitations.
- Using or inserting syntax in the bitstream to control partitioning processes in an encoder or a decoder.
- Using or inserting syntax in the bitstream to control partitioning related processes in an encoder or a decoder.
- Using or inserting syntax in the bitstream to control multi-hypothesis prediction tools in an encoder or a decoder.
- Using or inserting syntax in the bitstream to control MTS (multi-core transform) processes in an encoder or a decoder.
- Using or inserting syntax in the bitstream to control secondary transform modes in an encoder or a decoder.
- Using or inserting syntax in the bitstream to control recursive transform tree modes in an encoder or a decoder.
- Using or inserting syntax in the bitstream to control cross-component linear model or multi-directional linear model modes in an encoder or a decoder.
- Using or inserting syntax in the bitstream to control ATMVP (Alternative Temporal Motion Vector Prediction) modes in an encoder or a decoder.
- Using or inserting syntax in the bitstream to control high precision motion vector coding tools in an encoder or a decoder.
- Using or inserting syntax in the bitstream to control palette mode, current picture referencing, or separate luma/chroma tree in an encoder or a decoder.
- Using or inserting syntax in the bitstream to control dependent quantization or sign data hiding tools in an encoder or a decoder.
- Using or inserting syntax in the bitstream to mutually control separate luma/chroma tree and cross-component linear model/multi-directional linear model in an encoder or a decoder.
- A bitstream or signal that includes one or more of the described syntax elements, or variations thereof.
- A bitstream or signal that includes syntax conveying information generated according to any of the embodiments described.
- Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine tools in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
    inserting into a video bitstream syntax associated with at least one video coding tool;
    conditionally inserting into said bitstream one or more controls for one or more video coding tools based on said syntax, wherein said syntax is at a higher coding level than said one or more controls;
    activating one or more video coding tools corresponding to one or more video components based on said controls, and deactivating one or more video coding tools if said one or more controls is not inserted into the video bitstream; and,
    encoding the video bitstream using said activated video coding tools.

2. An apparatus, comprising:
    a processor, configured to:
    insert into a video bitstream syntax associated with at least one video coding tool;
    conditionally insert into said bitstream one or more controls for one or more video coding tools based on said syntax, wherein said syntax is at a higher coding level than said one or more controls;
    activate one or more video coding tools corresponding to one or more video components based on said controls, and deactivating one or more video coding tools if said one or more controls is not inserted into the video bitstream; and,
    encode the video bitstream using said activated video coding tools.

3. A method, comprising:
    parsing a video bitstream for syntax associated with at least one video coding tool;
    determining one or more controls for one or more video coding tools based on said syntax, wherein said syntax is at a higher coding level than said one or more controls;
    activating one or more video coding tools corresponding to one or more video components based on said determination, and deactivating one or more video coding tools if said determination is inferred to comprise one or more controls not being in the video bitstream; and,
    decoding the video bitstream using said activated video coding tools.

4. An apparatus, comprising:
    a processor, configured to:
    parse a video bitstream for syntax associated with at least one video coding tool;
    determine one or more controls for one or more video coding tools based on said syntax, wherein said syntax is at a higher coding level than said one or more controls;
    activate one or more video coding tools corresponding to one or more video components based on said determination, and deactivating one or more video coding tools if said determination is inferred to comprise one or more controls not being in the video bitstream; and,
    decode the video bitstream using said activated video coding tools.

5. The method of claim 3, wherein syntax indicates information of activated video coding tools associated to separate or non-separate components for multiple component video bitstreams.

6. The method of claim 5, wherein an index is used to indicate which component a video coding tool is to be applied.

7. The method of claim 3, wherein syntax for non-separate components in multiple component video bitstreams is grouped in one syntax set.

8. The method of claim 3, wherein syntax for a multiple component video bitstream indicates whether particular video coding tool controls are inserted for a bitstream component.

9. The method of claim 3, wherein multiple partitioning restrictions are controlled by a syntax element inserted into a high-level parameter set.

10. The method of claim 3, wherein multiple partitioning restriction flags are controlled sequentially, and wherein at least one restriction flag controls low-level restrictions.

11. The method of claim 3, wherein inter prediction tools based on multi-hypothesis prediction are controlled by a syntax element.

12. A device comprising:
    an apparatus according to claim 4; and
    at least one of (i) an antenna configured to receive a signal, the signal including a video block, (ii) a band limiter configured to limit the received signal to a band of frequencies that includes the video block, and (iii) a display configured to display an output representative of a video block.

13. A non-transitory computer readable medium containing data content generated according to the method of claim 1, for playback using a processor.

14. A non-volatile computer program product comprising instructions which, when the program is executed by a computer, cause the computer to carry out the method of claim 3.

15. The apparatus of claim 4, wherein syntax indicates information of activated video coding tools associated to separate or non-separate components for multiple component video bitstreams.

16. The apparatus of claim 15, wherein an index is used to indicate which component a video coding tool is to be applied.

17. The apparatus of claim 4, wherein syntax for a multiple component video bitstream indicates whether particular video coding tool controls are inserted for a bitstream component.

18. The apparatus of claim 4, wherein multiple partitioning restrictions are controlled by a high-level syntax element inserted into a high-level parameter set.

19. The apparatus of claim 4, wherein multiple high-level partitioning restriction flags are controlled sequentially, and wherein at least one high-level restriction flag controls low-level restrictions.

20. The apparatus of claim 4, wherein inter prediction tools based on multi-hypothesis prediction are controlled by a high-level syntax element.

* * * * *